(12) United States Patent
Hanover et al.

(10) Patent No.: US 11,600,945 B2
(45) Date of Patent: *Mar. 7, 2023

(54) EYEWEAR HAVING SELECTIVELY EXPOSABLE FEATURE

(71) Applicant: Snap Inc., Santa Monica, CA (US)

(72) Inventors: Matthew Hanover, Los Angeles, CA (US); Qiaokun Huang, Los Angeles, CA (US); David Meisenholder, Manhattan Beach, CA (US); Lauryn Morris, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/853,501

(22) Filed: Apr. 20, 2020

(65) Prior Publication Data
US 2020/0241329 A1 Jul. 30, 2020

Related U.S. Application Data

(60) Continuation of application No. 15/892,610, filed on Feb. 9, 2018, now Pat. No. 10,670,889, which is a
(Continued)

(51) Int. Cl.
*H01R 13/62* (2006.01)
*G02C 5/14* (2006.01)
(Continued)

(52) U.S. Cl.
CPC .......... *H01R 13/6205* (2013.01); *G02C 5/146* (2013.01); *G02C 5/22* (2013.01); *G02C 11/10* (2013.01); *G02C 2200/02* (2013.01)

(58) Field of Classification Search
CPC ...................... H01R 13/6205; G02C 2200/025
See application file for complete search history.

(56) References Cited

U.S. PATENT DOCUMENTS 2,794,085 A 5/1957 Angelis
4,456,346 A 6/1984 Beyer
(Continued)

FOREIGN PATENT DOCUMENTS

CA 2887596 A1 7/2015
EP 2596716 5/2013
(Continued)

OTHER PUBLICATIONS

U.S. Appl. No. 17/453,422, filed Nov. 3, 2021, Eyewear With Conductive Temple Joint.
(Continued)

*Primary Examiner* — Sunita Joshi
(74) *Attorney, Agent, or Firm* — Schwegman Lundberg & Woessner, P.A.

(57) ABSTRACT

Apparatuses, systems and methods for wearable devices such as eyewear are described. According to one embodiment, the wearable device includes a body, electronics, and a connector. The body is configured to hold one or more optical elements, the body being disposable between a collapsed condition and a wearable condition in which the device is wearable by a user to hold the one or more optical elements within user view. The electronics are carried by the body. The connector is configured to enable establishment of an electrical and/or electronic connection with the electronics via the connector, the connector being housed by the body such that the connector is substantially obscured from view when the body is in the wearable condition, and such that the connector is exposed for connective access when the body is in the collapsed condition.

18 Claims, 13 Drawing Sheets

Related U.S. Application Data division of application No. 15/339,526, filed on Oct. 31, 2016, now Pat. No. 9,952,452, which is a continuation of application No. 14/687,308, filed on Apr. 15, 2015, now Pat. No. 9,482,882.

(51) Int. Cl.
*G02C 11/00* (2006.01)
*G02C 5/22* (2006.01)

(56) References Cited

U.S. PATENT DOCUMENTS

| | | | |
|---|---|---|---|
| 5,258,784 | A | 11/1993 | Baines |
| 5,606,743 | A | 2/1997 | Vogt et al. |
| 5,900,720 | A | 5/1999 | Kallman et al. |
| 6,038,295 | A | 3/2000 | Mattes |
| 6,091,546 | A | 7/2000 | Spitzer |
| 6,854,845 | B1 | 2/2005 | Goldman et al. |
| 6,980,909 | B2 | 12/2005 | Root et al. |
| 7,173,651 | B1 | 2/2007 | Knowles |
| 7,411,493 | B2 | 8/2008 | Smith |
| 7,470,023 | B2 | 12/2008 | Glinert |
| 7,535,890 | B2 | 5/2009 | Rojas |
| 7,677,723 | B2 | 3/2010 | Howell et al. |
| 7,946,705 | B1 | 5/2011 | Hsu |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,432,124 | B2 | 4/2013 | Foster |
| 8,678,581 | B2 | 3/2014 | Blum |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,979,259 | B2 | 3/2015 | Haddock et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,482,882 | B1 | 11/2016 | Hanover et al. |
| 9,482,883 | B1 | 11/2016 | Meisenholder |
| 9,489,661 | B2 | 11/2016 | Evans et al. |
| 9,491,134 | B2 | 11/2016 | Rosen et al. |
| 9,726,904 | B1 | 8/2017 | Lin |
| 9,740,023 | B1 | 8/2017 | Ashwood |
| 9,952,452 | B1 | 4/2018 | Hanover et al. |
| 9,971,169 | B1 | 5/2018 | Lin |
| 10,514,559 | B1 | 12/2019 | Meisenholder |
| 10,591,745 | B1 | 3/2020 | Lin |
| 10,670,889 | B1 | 6/2020 | Hanover et al. |
| 10,993,515 | B1 | 5/2021 | Kim et al. |
| 11,188,123 | B1 | 11/2021 | Lin |
| 11,219,287 | B1 | 1/2022 | Kim et al. |
| 11,300,814 | B1 | 4/2022 | Meisenholder |
| 2005/0242771 | A1* | 11/2005 | Blum .................. G02C 7/101 320/114 |
| 2007/0132942 | A1 | 6/2007 | Zelazowski |
| 2008/0106694 | A1 | 5/2008 | Blum et al. |
| 2008/0129953 | A1 | 6/2008 | Blum et al. |
| 2009/0002626 | A1 | 1/2009 | Wakabayashi |
| 2009/0296044 | A1 | 12/2009 | Howell et al. |
| 2010/0294675 | A1 | 11/2010 | Mangano |
| 2011/0058141 | A1 | 3/2011 | Cozzani |
| 2011/0202598 | A1 | 8/2011 | Evans et al. |
| 2012/0155064 | A1 | 6/2012 | Waters |
| 2012/0176580 | A1 | 7/2012 | Sonsino |
| 2012/0020331 | A1 | 8/2012 | Pugh et al. |
| 2012/0209924 | A1 | 8/2012 | Evans et al. |
| 2012/0220234 | A1 | 8/2012 | Abreu |
| 2014/0305814 | A1 | 10/2014 | Santarelli |
| 2015/0200554 | A1 | 7/2015 | Marks et al. |
| 2018/0090958 | A1 | 3/2018 | Steger et al. |
| 2018/0136491 | A1 | 5/2018 | Ashwood et al. |
| 2021/0298440 | A1 | 9/2021 | Kim et al. |
| 2022/0057830 | A1 | 2/2022 | Lin |
| 2022/0151356 | A1 | 5/2022 | Kim et al. |

FOREIGN PATENT DOCUMENTS

| | | | |
|---|---|---|---|
| EP | 2596716 A1 * | 5/2013 | ............ A45C 11/04 |
| FR | 2114282 | 6/1972 | |
| GB | 384198 | 12/1932 | |
| WO | WO-2013103985 A2 | 7/2013 | |

OTHER PUBLICATIONS

U.S. Appl. No. 17/535,158, filed Nov. 24, 2021, Eyewear Device Charging Case.
"U.S. Appl. No. 16/790,971, 312 Amendment filed Oct. 14, 2021", 5 pgs.
"U.S. Appl. No. 16/790,971, PTO Response to Rule 312 Communication dated Oct. 28, 2021", 2 pgs.
"U.S. Appl. No. 16/696,499, Notice of Allowance dated Dec. 15, 2021", 9 pgs.
"U.S. Appl. No. 16/696,499, Corrected Notice of Allowability dated Dec. 30, 2021", 2 pgs.
"U.S. Appl. No. 17/535,158, Preliminary Amendment filed Feb. 8, 2022", 7 pgs.
U.S. Appl. No. 16/115,286 U.S. Pat. No. 10,993,515, filed Aug. 28, 2018, Carry Case for Rechargeable Eyewear Devices.
U.S. Appl. No. 17/301,738, filed Apr. 13, 2021, Carry Case for Rechargeable Eyewear Devices.
U.S. Appl. No. 16/115,273, filed Aug. 28, 2018, Eyewear Device Charging Case.
U.S. Appl. No. 14/687,308 U.S. Pat. No. 9,482,882, filed Apr. 15, 2015, Eyewear Having Selectively Exposable Feature.
U.S. Appl. No. 15/339,526 U.S. Pat. No. 9,952,452, filed Oct. 31, 2016, Eyewear Having Selectively Exposable Feature.
U.S. Appl. No. 15/892,610, filed Feb. 9, 2018, Eyewear Having Selectively Exposable Feature.
U.S. Appl. No. 14/687,362 U.S. Pat. No. 9,482,883, filed Apr. 15, 2015, Eyewear Having Linkage Assembly Between a Temple and a Frame.
U.S. Appl. No. 15/339,537 U.S. Pat. No. 10,514,559, filed Oct. 31, 2016, Eyewear Having Linkage Assembly Between a Temple and a Frame.
U.S. Appl. No. 14/869,149 U.S. Pat. No. 9,726,904, filed Sep. 29, 2015, Eyewear With Conductive Temple Joint.
U.S. Appl. No. 15/642,878 U.S. Pat. No. 9,971,169, filed Jul. 6, 2017, Eyewear With Conductive Temple Joint.
U.S. Appl. No. 16/696,499, filed Nov. 26, 2019, Eyewear Having Linkage Assembly Between a Temple and a Frame.
U.S. Appl. No. 15/949,852 U.S. Pat. No. 10,591,745, filed Apr. 10, 2018, Eyewear With Conductive Temple Joint.
U.S. Appl. No. 16/790,971, filed Feb. 14, 2020, Eyewear With Conductive Temple Joint.
"Amendment and Response to Non Final Office Action: U.S. Appl. No. 15/339,526, Response filed Jun. 13, 2017 to Non Final Office Action dated Mar. 13, 2017", 13 pgs.
"U.S. Appl. No. 14/687,308, Final Office Action dated Feb. 1, 2016", 12 pgs.
"U.S. Appl. No. 14/687,308, Non Final Office Action dated May 29, 2015", 9 pgs.
"U.S. Appl. No. 14/687,308, Notice of Allowance dated Aug. 3, 2016", 13 pgs.
"U.S. Appl. No. 14/687,308, Response filed Jun. 24, 2016 to Final Office Action dated Feb. 1, 2016", 18 pgs.
"U.S. Appl. No. 14/687,308, Response filed Oct. 28, 2015 to Non Final Office Action dated May 29, 2015", 20 pgs.
"U.S. Appl. No. 14/687,362, Non Final Office Action dated Jan. 6, 2016", 8 pgs.
"U.S. Appl. No. 14/687,362, Non Final Office Action dated May 29, 2015", 7 pgs.

(56) References Cited

OTHER PUBLICATIONS

"U.S. Appl. No. 14/687,362, Notice of Allowance dated Sep. 6, 2016", 7 pgs.
"U.S. Appl. No. 14/687,362, Response filed Jun. 3, 2016 to Non Final Office Action dated Jan. 6, 2016", 14 pgs.
"U.S. Appl. No. 14/687,362, Response filed Oct. 28, 2015 to Non Final Office Action dated May 29, 2015", 16 pgs.
"U.S. Appl. No. 14/869,149 Amendment and Response filed Mar. 16, 2017 to Non Final Office Action dated Dec. 5, 2016", 20 pgs.
"U.S. Appl. No. 14/869,149, Corrected Notice of Allowance dated Apr. 17, 2017", 2 pgs.
"U.S. Appl. No. 14/869,149, Non Final Office Action dated Dec. 5, 2016", 14 pgs.
"U.S. Appl. No. 14/869,149, Notice of Allowance dated Mar. 24, 2017", 7 pgs.
"U.S. Appl. No. 14/869,149, PTO Response to Rule 312 Communication dated Jun. 29, 2017", 2 pgs.
"U.S. Appl. No. 15/339,526, Final Office Action dated Sep. 14, 2017", 11 pgs.
"U.S. Appl. No. 15/339,526, Non Final Office Action dated Mar. 13, 2017", 6 pgs.
"U.S. Appl. No. 15/339,526, Notice of Allowance dated Dec. 11, 2017", 18 pgs.
"U.S. Appl. No. 15/339,526, Response filed Nov. 13, 2017 to Final Office Action dated Sep. 14, 2017", 8 pgs.
"U.S. Appl. No. 15/339,537, Advisory Action dated Feb. 5, 2018", 3 pgs.
"U.S. Appl. No. 15/339,537, Advisory Action dated Jun. 26, 2019", 3 pgs.
"U.S. Appl. No. 15/339,537, Corrected Notice of Allowability dated Nov. 13, 2019", 2 pgs.
"U.S. Appl. No. 15/339,537, Final Office Action dated Mar. 22, 2019", 13 pgs.
"U.S. Appl. No. 15/339,537, Final Office Action dated Nov. 17, 2017", 13 pgs.
"U.S. Appl. No. 15/339,537, Non Final Office Action dated Mar. 14, 2017", 5 pgs.
"U.S. Appl. No. 15/339,537, Non Final Office Action dated Aug. 10, 2018", 13 pgs.
"U.S. Appl. No. 15/339,537, Notice of Allowance dated Aug. 26, 2019", 7 pgs.
"U.S. Appl. No. 15/339,537, Response filed Jan. 17, 2018 to Final Office Action dated Nov. 17, 2017", 12 pgs.
"U.S. Appl. No. 15/339,537, Response filed May 20, 2019 to Final Office Action dated Mar. 22, 2019", 14 pgs.
"U.S. Appl. No. 15/339,537, Response filed Jul. 18, 2017 to Non Final Office Action dated Mar. 14, 2017", 11 pgs.
"U.S. Appl. No. 15/339,537, Response filed Nov. 8, 2018 to Non Final Office Action dated Aug. 10, 2018", 16 pgs.
"U.S. Appl. No. 15/642,878, Non Final Office Action dated Sep. 18, 2017", 12 pgs.
"U.S. Appl. No. 15/642,878, Notice of Allowance dated Jan. 22, 2018", 11 pgs.
"U.S. Appl. No. 15/642,878, Response filed Dec. 8, 2017 to Non Final Office Action dated Sep. 18, 2017", 17 pages.
"U.S. Appl. No. 15/892,610, Non Final Office Action dated Sep. 13, 2019", 11 pgs.
"U.S. Appl. No. 15/892,610, Notice of Allowance dated Jan. 24, 2020", 8 pgs.
"U.S. Appl. No. 15/892,610, Response filed Dec. 12, 2019 to Non Final Office Action dated Sep. 13, 2019", 10 pgs.

"U.S. Appl. No. 15/892,610, Response filed Jun. 21, 2019 to Restriction Requirement dated Apr. 25, 2019", 7 pgs.
"U.S. Appl. No. 15/892,610, Restriction Requirement dated Apr. 25, 2019", 6 pgs.
"U.S. Appl. No. 15/949,852, Non Final Office Action dated Jul. 25, 2019", 5 pgs.
"U.S. Appl. No. 15/949,852, Notice of Allowance dated Nov. 6, 2019", 7 pgs.
"U.S. Appl. No. 15/949,852, Response filed Oct. 24, 2019 to Non-Final Office Action dated Jul. 25, 2019", 8 pgs.
"U.S. Appl. No. 16/790,971, Preliminary Amendment filed Mar. 30, 2020", 6 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
"U.S. Appl. No. 16/115,286, Restriction Requirement dated Jan. 21, 2020", 8 pgs.
"U.S. Appl. No. 16/115,286, Response filed Apr. 21, 2020 to Restriction Requirement dated Jan. 21, 2020", 9 pgs.
"U.S. Appl. No. 16/115,273, Non Final Office Action dated Apr. 30, 2020", 11 pgs.
"U.S. Appl. No. 16/115,286, Non Final Office Action dated May 4, 2020", 14 pgs.
"U.S. Appl. No. 16/115,286, Examiner Interview Summary dated Jul. 20, 2020", 3 pgs.
"U.S. Appl. No. 16/115,286, Response filed Aug. 4, 2020 to Non Final Office Action dated May 4, 2020", 13 pgs.
"U.S. Appl. No. 16/115,273, Response filed Aug. 31, 2020 to Non Final Office Action dated Apr. 30, 2020", 11 pgs.
"U.S. Appl. No. 16/115,286, Final Office Action dated Sep. 14, 2020", 11 pgs.
"U.S. Appl. No. 16/115,273, Final Office Action dated Dec. 10, 2020", 13 pgs.
"U.S. Appl. No. 16/115,286, Response filed Dec. 14, 2020 to Final Office Action dated Sep. 14, 2020", 8 pgs.
"U.S. Appl. No. 16/115,286, Notice of Allowance dated Jan. 6, 2021", 7 pgs.
"U.S. Appl. No. 16/115,273, Response filed Mar. 10, 2021 to Final Office Action dated Dec. 10, 2020", 10pgs.
"U.S. Appl. No. 16/115,273, Non Final Office Action dated Apr. 1, 2021", 12 pgs.
"U.S. Appl. No. 16/790,971, Non Final Office Action dated Apr. 19, 2021", 11 pgs.
"U.S. Appl. No. 17/301,738, Preliminary Amendment filed Jun. 17, 2021", 8 pgs.
"U.S. Appl. No. 16/115,273, Response filed Jun. 18, 2021 to Non Final Office Action dated Apr. 1, 2021", 10 pgs.
"U.S. Appl. No. 16/790,971, Response filed Jul. 14, 2021 to Non Final Office Action dated Apr. 19, 2021", 12 pgs.
"U.S. Appl. No. 16/790,971, Notice of Allowance dated Jul. 27, 2021", 5 pgs.
"U.S. Appl. No. 16/790,971, Corrected Notice of Allowability dated Aug. 9, 2021", 2 pgs.
"U.S. Appl. No. 16/115,273, Notice of Allowance dated Aug. 17, 2021", 7 pgs.
"U.S. Appl. No. 16/115,273, Supplemental Notice of Allowability dated Aug. 27, 2021", 2 pgs.
"U.S. Appl. No. 17/301,738, Corrected Notice of Allowability dated Jun. 29, 2022", 2 pgs.
"U.S. Appl. No. 17/301,738, Notice of Allowance dated Jun. 15, 2022", 8 pgs.

\* cited by examiner

EYEWEAR HAVING SELECTIVELY EXPOSABLE FEATURE

CLAIM OF PRIORITY

This application is a continuation of U.S. patent application Ser. No. 15/892,610, filed on Feb. 9, 2018, which is a divisional of U.S. patent application Ser. No. 15/339,526, filed on Oct. 31, 2016, which claims the benefit of priority of U.S. patent application Ser. No. 14/687,308, filed on Apr. 15, 2015; each of which are hereby incorporated by reference in their entireties.

CROSS-REFERENCE TO RELATED APPLICATIONS

This application is related to U.S. patent application Ser. No. 14/687,362, filed on Apr. 15, 2015; U.S. patent application Ser. No. 15/339,537, filed on Oct. 31, 2016; and U.S. patent application Ser. No. 16/696,499, filed on Nov. 26, 2019; each of which are hereby incorporated by reference in their entireties.

TECHNICAL FIELD

The subject matter disclosed herein generally relates to eyewear. Specifically, the present disclosure addresses apparatuses, systems and methods for eyewear including a connector that is selectively exposable with movement of the eyewear's temple.

BACKGROUND

Eyewear, especially those carrying onboard electronics, can be bulky, making them difficult to transport when not being worn. Additionally, the electronics often include ports or other connection mechanisms for the transfer of power and/or data. These factors often cause electronically-enabled eyewear to be unwieldy, unsightly, or both.

BRIEF DESCRIPTION OF THE DRAWINGS

The present disclosure is illustrated by way of example, and not by way of limitation, in the figures of the accompanying drawings, in which.

OVERVIEW

A brief overview of some aspects of the disclosure with reference to selected drawings follows, after which various features of the disclosed subject matter will be described in greater detail.

One aspect of the disclosure provides an eyewear article with onboard electronics that includes a charging and/or data interface or port that is hidden from view when the eyewear article is in a wearable configuration (e.g., FIG. 4), the interface or port being exposed for coupling with an external power and/or data source when the eyewear article is in a folded or collapsed configuration (e.g., FIGS. 1D and 6), to provide a data and/or power link to the external source via the interface or port.

For ease of description, the article of eyewear is further in this overview referred to as smart glasses. The port may comprise any suitable connector configured for contact coupling with a complementary connector to establish an electrical and/or electronic link, including for example a socket, a plug, a contact pin, a contact pad, micro-USB, or the like.

The smart glasses may have a body comprising a lens-carrying frame and a pair of temples hingedly mounted on opposite ends of the frame. The smart glasses are in such cases in the wearable configuration or mode when both temples are substantially fully unfolded for reception on opposite sides of a user's head. In contrast, the smart glasses are in the folded condition when at least one of the temples is hingedly folded towards the frame sufficiently to expose the port for connection to the external source. The folded condition thus includes both a fully folded condition in which both temples are hinged fully inwardly towards the frame (e.g., FIG. 1), and partially folded condition (e.g., FIGS. 6 and 10B).

In some embodiments, the port is located at a hinge joint where one of the temples is hingedly connected to the frame. The port may be located on one of a pair of joint faces provided by the frame and the temple respectively, the joint faces being in face-to-face abutment when in the wearable condition (e.g., FIG. 4), and being spaced from one another when in the folded condition (see, e.g., exposed end faces 322 and 334 in FIG. 6). In other embodiments, dual ports may be implemented with a single port on each temple (along with associated electronics components).

Figure 5:
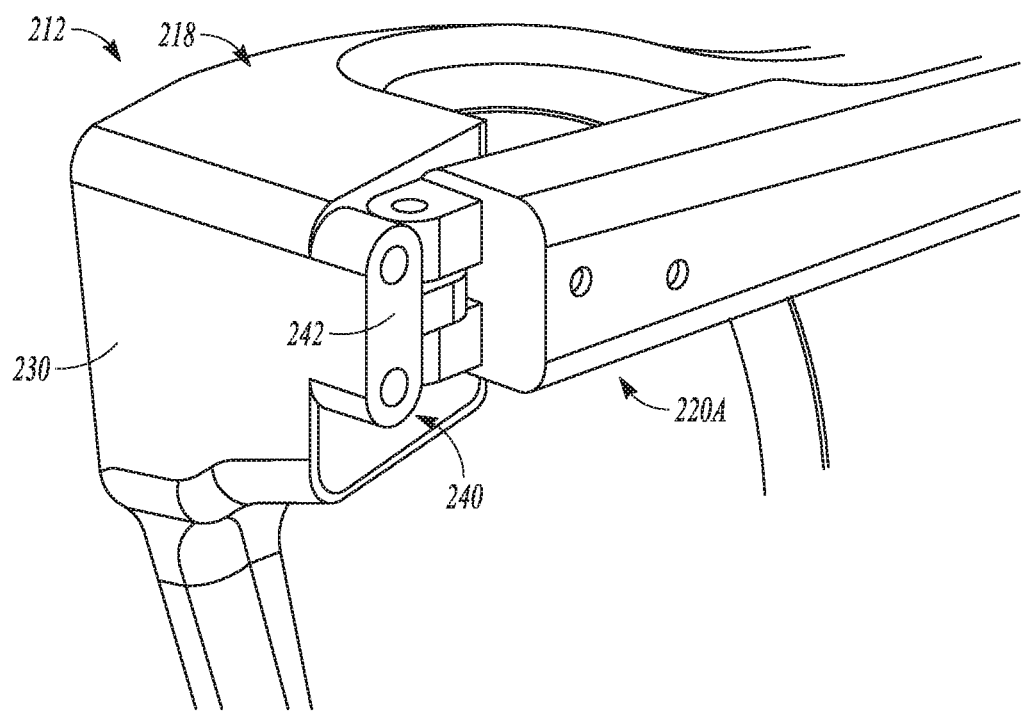
FIG. 5 is a perspective view of the portion of the frame and the portion of a temple of the eyewear of FIG. 4 in a folded second position according to an example embodiment.
Figure 6:
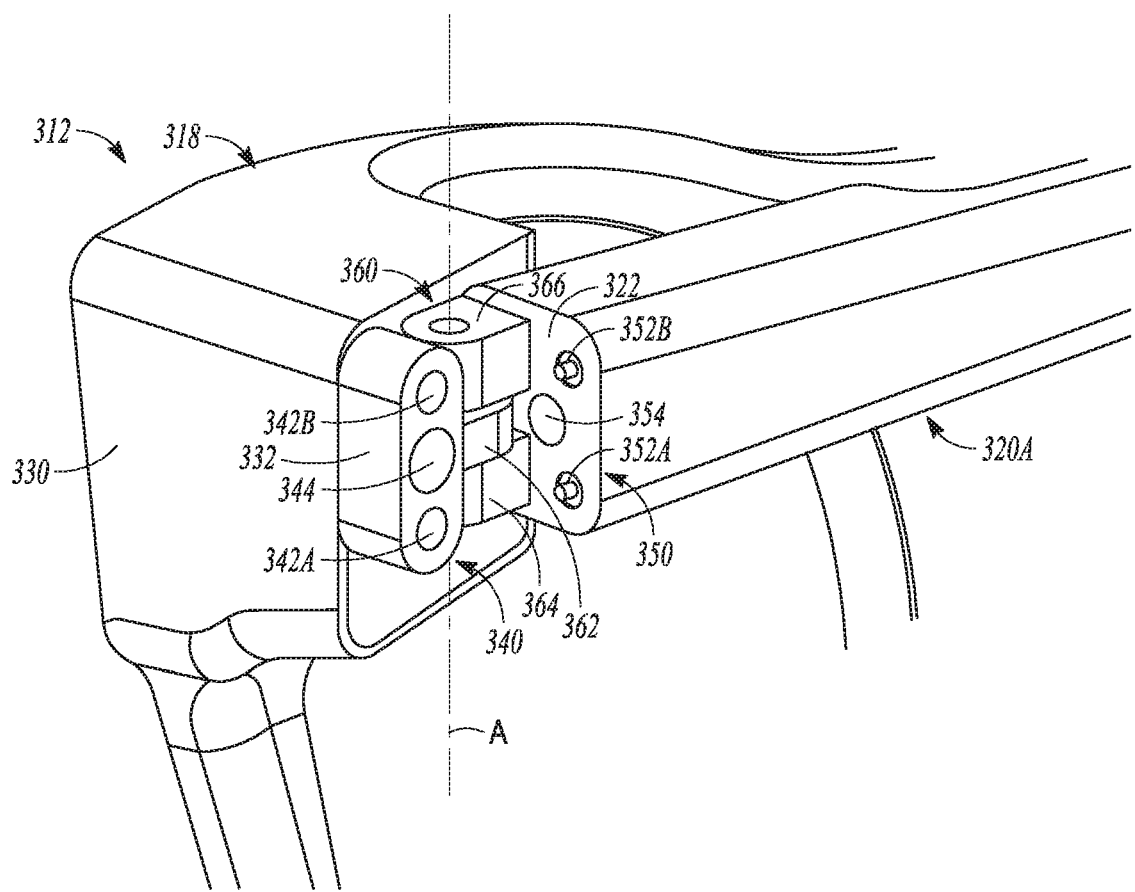
FIG. 6 is a perspective view of a first connector disposed in the frame at a hinge portion of the frame and a second connector disposed in the temple, according to an example embodiment.

A port or connector may be provided on the frame's joint face (e.g., FIG. 5), on the temple's joint face, or on both (e.g., FIG. 6). In some embodiments, electrical/electronic components may be carried both by the frame and at least one of temples. In such cases, the temple and the frame may carry cooperating ports configured for automatic contact coupling when the smart glasses are in the wearing condition, to provide a data and/or power connection between electronics in the temple and electronics in the frame. See, for example, FIG. 6, in which a pair of pogo pins 352 on an end face of the temple automatically contacts corresponding contact pads 342 on a rear end face of the frame.

The hinge joint may include a mechanism to promote continuous contact engagement between the cooperating ports on the temple and the frame when the smart glasses are worn, for example comprising cooperating magnetic elements on the frame and the temple respectively. In the example embodiment of FIG. 6, for example, a magnet 344 on a rear end face of the frame is brought into close proximity with a ferromagnetic pad incorporated in the temple near its end face 322 when the temple is moved into position for wearing of the smart glasses.

Figure 1:
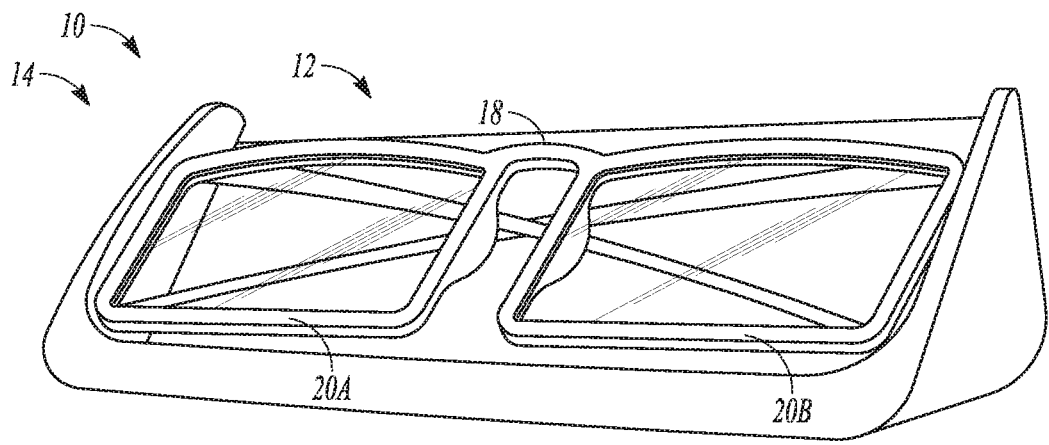
FIG. 1 is a front perspective view of a system including eyewear and a case according to one embodiment.
Figure 1A:
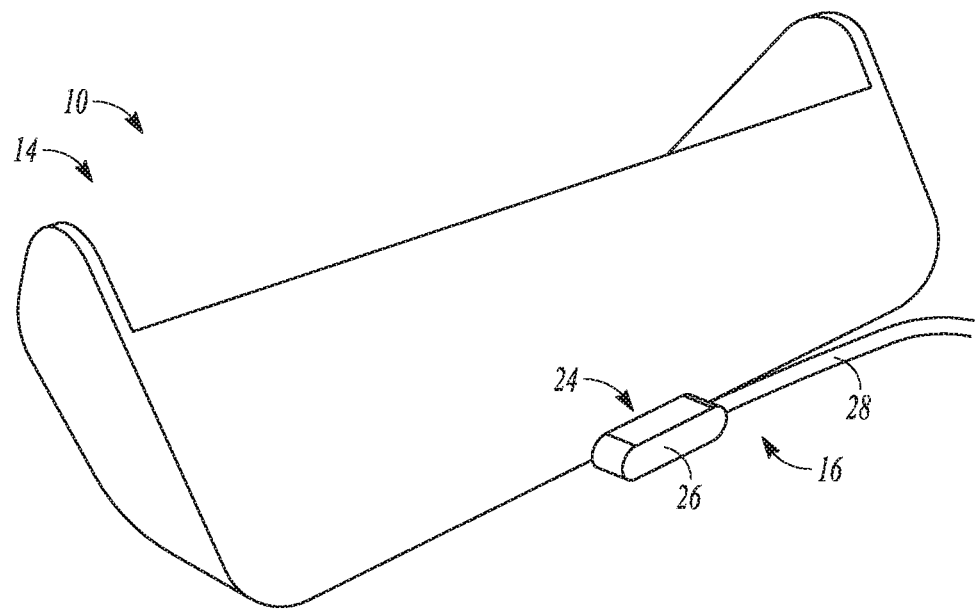
FIG. 1A is a rear perspective view of the system of FIG. 1 including the case and a cable coupled to the case according to one embodiment.
Figure 1B:
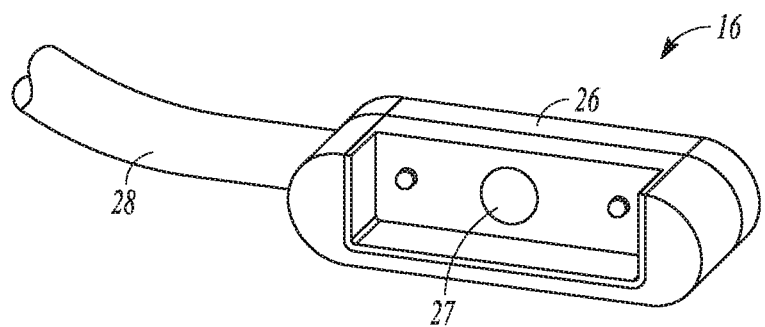
FIG. 1B is a perspective view of a portion of the cable from FIG. 1B according to one embodiment.
Figure 1C:
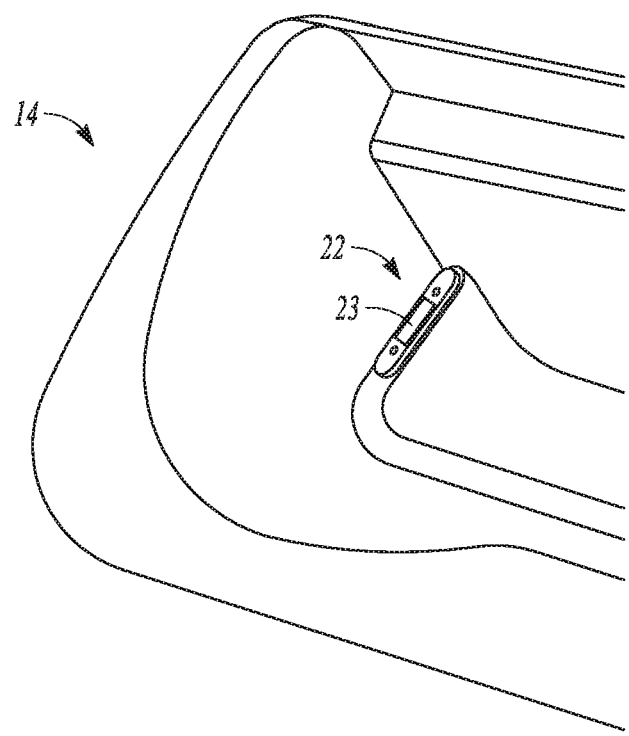
FIG. 1C is an enlargement of an interior portion of a case from FIG. 1 illustrating a connector according to one embodiment.
Figure 1D:
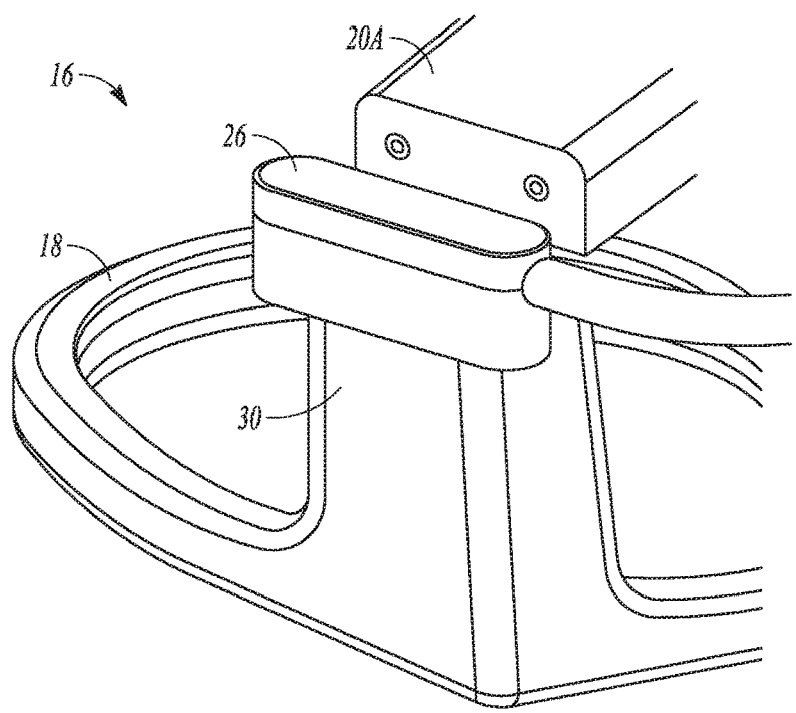
FIG. 1D is a perspective view of the portion of the cable of FIG. 1B mounted to the eyewear according to one embodiment.

When the smart glasses are in the folded condition, its onboard electronics can be connected to the external source via a cable with having a connector complementary to the port (e.g., FIG. 1D). In some embodiments, the connection provided via the port includes a data connection for transmitting data signals, enabling information upload and/or download between the external source and the smart glasses. Instead, or in addition, the port connection in some embodiments provides a power connection to enable, for example, recharging of an onboard battery of the smart glasses.

Another aspect of the disclosure comprises a holder for the smart glasses, the holder having a base connector configured for contact coupling with the port of the smart glasses when they are received by the holder in a fully folded condition. In some embodiments, the holder is a case (see, e.g., FIGS. 1 and 1A) that defines a storage formation complementary to the smart glasses in the folded condition, with the base connector positioned in the interior of the case for automatic coupling with the exposed port when the folded smart glasses are engaged with the storage formation. In some embodiments, the case includes a battery connected to the base connector for charging the stowed smart glasses via the port. In some embodiments, the case includes an external port that is connected to the base port and that is accessible from the exterior of the case for wired connection to an external source (see, e.g., FIG. 1A).

A further aspect of the disclosure thus includes a kit or system comprising the smart glasses and a complementary holder configured for coupling with the port when the smart glasses are held thereby.

DETAILED DESCRIPTION

The description that follows includes apparatuses, systems, methods, and techniques that embody illustrative examples of the disclosure. In the following description, for the purposes of explanation, numerous specific details are set forth in order to provide an understanding of various embodiments of the inventive subject matter. It will be evident, however, to those skilled in the art; that embodiments of the inventive subject matter may be practiced without these specific details. In general, well-known structures and techniques are not necessarily shown in detail.

FIGS. 1, 1A, 1B, 1C, and 1D illustrate a smart eyewear kit 10 including a wearable electronic device according to one example embodiment. The kit 10 in this example includes an article of electronics-enabled eyewear in the form of a pair of smart glasses 12, a container or holder in the example form of a case 14, and a cable 16. The glasses 12 can generally include a frame 18, temples 20A and 20B, and electronics (including a connector (not shown)); the details of each will be discussed in further detail subsequently. The case 14 can include electronic connectors in the example form of a base or internal connector 22 and an external port or connector 24 as illustrated in FIGS. 1A and 1C. As shown in FIGS. 1A and 1B, the cable 16 can include a connector 26 at a first end 28 thereof.

As illustrated variously in FIGS. 1, 1A, 1B, 1C, and 1D the glasses 12, the case 14, and the cable 16 can interact together in various ways and for various purposes. For example, the case 14 can be used to transport and protect the glasses 12, to charge the electronics incorporated in the glasses 12, and/or to communicate with the electronics of the glasses 12. Thus, in some embodiments the case 14 houses a battery and can be an external source of power for the glasses 12. The internal connector 22 is configured to couple to the corresponding connector of the glasses 12 for power and/or data communication when the glasses 12 are docked in the case 14. As such, the interior of the case can be shaped to receive the glasses 12 only when the temples 20A, 20B are folded. The shape of the interior also can be such that the port of the glasses interfaces directly with the internal connector 22 when the glasses are docked in the case 14 with little slippage or movement occurring between the case 14 and the glasses 12. Although illustrated as pogo pin/pad connections, the connectors can be of virtually any type known in the art for power and/or data communication such as micro-USB, or the like.

According to some embodiments, the connector 26 of the cable 16 is configured to couple to the glasses 12 as illustrated in FIG. 1D, In particular, the connector 26 can be provided with a partially recessed face that is configured to mount on the frame 18 in portion 30 when the hinge 20A is pivoted to a charging position. Such coupling can occur, for example, when the temple 20A is disposed in the folded position according to some embodiments. In some embodiments, the cable 16 is configured to couple with an external source of power, data, or power and data for the electronics mounted to the glasses 12. According to additional embodiments the connector 26 of the cable 16 can additionally be configured to couple to at least one of the connectors 22, 24 of the case 14. A second end of the cable 16 can be configured to couple with the external source of power, data, or power and data for the electronics housed within the case 14.

As shown in FIG. 1, the case 14 is configured to receive the frame 18 and the temples 20A and 20B therein with the temples 20A and 20B disposed in a folded position relative to the frame 18. In such a position, the internal connector 22 (FIG. 1C) interfaces with and is configured to couple to the connector (shown subsequently) of the glasses 12. As discussed, in addition to the internal connector 22 and external connector 24 (FIG. 1A), the case 14 can be configured to house electronics such as a battery used to charge and/or communicate with the electronics of the glasses 12.

FIG. 1A illustrates a second side of the case 14 coupled to the cable 16 at the external connector 24 (covered by the connector 26 of the cable 16). Although illustrated on a second (e.g., rear) side of the case 14 in the embodiment of FIG. 1A, in other embodiments the external connector 24 can be located on a front side, an interior, or on other sides of the case 14. As shown in FIG. 1A, the connector 26 of the cable 14 can be coupled to and decoupled from the external connector 24. FIG. 1B illustrates the connector 26 of the cable 14 as a pogo-pin type connection disposed in a recess. A magnet or magnetically attracted material 27 can be positioned along the face of the connector 26 such as between the pogo-pin type connection illustrated. According to other examples, the connector 26 can be of any type known in the art for power and/or data communication such as a micro-USB, or the like.

FIG. 1C illustrates the internal connector 22 disposed in the interior of the case 14. The interior of the case 14 is configured to dispose the connector of the eyewear to interface with and couple with the internal connector 22. As illustrated, the internal connector 22 comprises a pogo pin type connection although other types of connections such as micro-USB are anticipated. According to the illustrated example of FIG. 1C, the internal connector 22 includes a piece of magnet 23 or magnet attractable material that is attracted to a magnetic field. A corresponding magnet or attractable material can be utilized on the glasses 12. As such, the magnet 23 or other material may be used to aid in coupling of the connectors between the glasses 12 and the case 14 (or the glasses 12 and the cable 16).

FIG. 1D shows the connector 26 of the cable 16 coupled to the glasses 12, specifically the frame 18. In FIG. 1D, the temple 20A (FIG. 1) is removed for illustrative purposes. The connector 26 is configured to couple to the frame 18 at one of two generally opposing connection portions, of which only connection portion 30 is illustrated in FIG. 1D. As discussed previously, the cable 16 can couple with an external source of power, data, or power and data for the electronics housed within the frame 18. Although not illustrated in the embodiment of FIG. 1D, it is anticipated that in other embodiments the connector 26 can mount to one or more of the temples 20A and 20B (FIG. 1) such as the temple 20A (FIG. 1) rather than the frame 18. Alternatively, the cable 16 can be configured to mount to both the temple 20A and the frame 18 such as with the use of dual connectors. According to further embodiments, two connectors (e.g., two connectors on the interior of the case 14, a cable with two connectors, two cables each with a connector, and the like) can be utilized one for each of the connection portions of the frame 18. In other embodiments, similar two connector arrangements can be utilized to couple two connectors one on each temple of the eyewear. In yet further example embodiments, the number of connectors and the number of pins, ports, pads, and the like for each connector can vary as desired. Such variation can be dictated by operation requirements, for example. Operation requirements can include a need for power and/or data transfer to or from the electronics mounted to the glasses 12.

Figure 2:
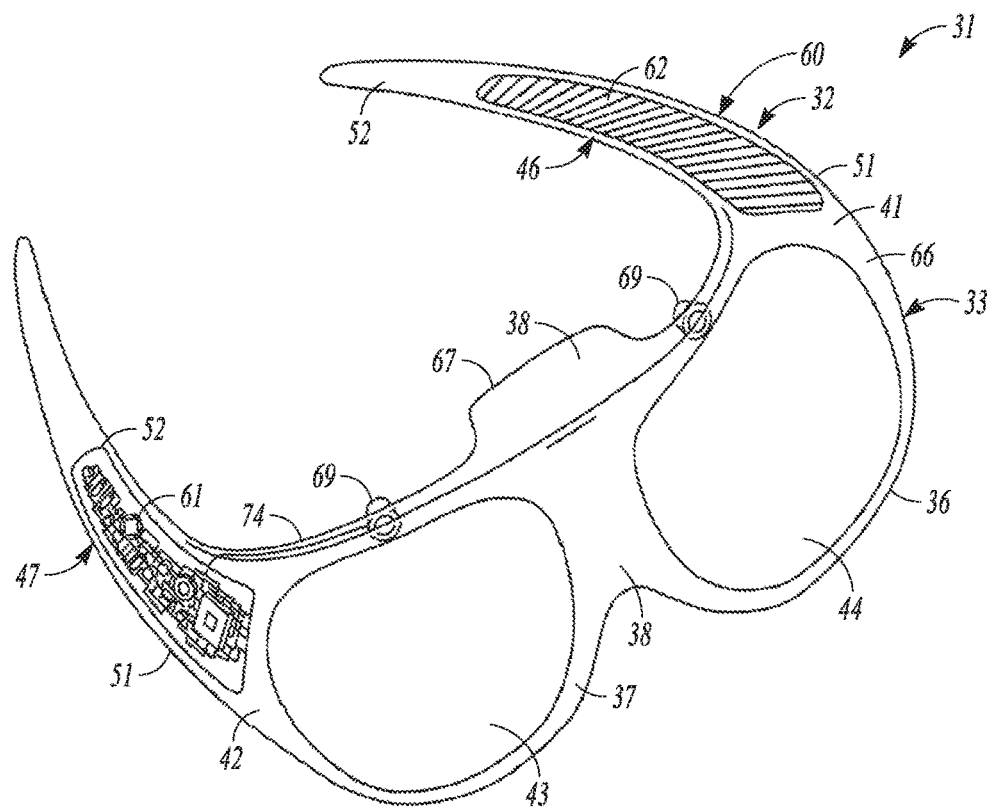
FIG. 2 is a front perspective view of eyewear comprising smart glasses according to one embodiment.

FIG. 2 shows an example embodiment of the eyewear 31 as illustrated in a front perspective view. Eyewear 31 can have similar features (e.g., electronics) to those previously discussed with reference to glasses 12. As discussed previously, the eyewear 31 can include a frame 32. The frame 32 can be made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a first connection portion 41 (similar to the first connection portion 30 illustrated previously in FIG. 1D) and a second connection portion 42. A first or left optical element 43 and a second or right optical element 44 can be provided within respective left and right optical element holders 36, 37. Each of the optical elements 43, 44 can be a lens, a display (e.g., LCD), a display assembly or a combination of the foregoing. Any of the display assemblies disclosed herein can be provided in the eyewear 31.

Eyewear 31 additionally includes first and second temple pieces 46, 47 (similar to the first temple piece 20A and the second temple piece 20B discussed previously). The first temple piece 46 and the second temple piece 47 are configured to selectively interface with the respective first and second connection portions 41, 42 such as when the temple pieces 46, 47 are in a first wearable position similar the one illustrated in FIG. 2. The first and second temple pieces 46, 47 are configured to be coupled to the respective first and second connection portions 41, 42 located generally at opposing end portions of the front piece 33. Suitable means for coupling the first and second temple pieces 46, 47 to the respective first and second connection portions 41, 42 will be described in further detail subsequently. In brief, coupling can comprise, for example, a hinge (illustrated subsequently with reference to FIGS. 5, 6, 6A, and 6B), a linkage assembly (illustrated subsequently with reference to FIGS. 8A, 8B, and 8C), and a linkage assembly (illustrated with reference to FIGS. 9A, 9B, 9C, 10A, and 10B). As illustrated in the embodiment of FIG. 2, one or more of the temple pieces 46, 47 can include electronics 60 mounted thereto (e.g., molded or otherwise housed therein). Similarly, according to the embodiment of FIG. 2, the frame 32 can include electronics 60 mounted thereto (e.g., molded or otherwise housed therein).

According to the embodiment of FIG. 2, each of the temple pieces 41, 42 can include a first portion 51 that is coupled to one of the respective connection portions 41, 42 of the front piece 33. The temple pieces 46, 47 can additionally include a second portion 52, such as curved or arcuate piece, for coupling to the ear of the user. In one embodiment, the front piece 33 can be formed from a single piece of material, to have a unitary or integral construction. In one embodiment, such as illustrated in FIG. 1, the entire frame 32 can be formed from a single piece of material to have a unitary or integral construction. In other embodiments, portions of the frame 32 such as the connection portions 41, 42 need not be integral with the frame 32.

Eyewear 31 can include suitable electronics 60 such as a computing device, such as computer 61, which can be of any suitable type to be carried by the frame 32. In some embodiments, the electronics such as the computer 61 can be at least partially disposed in one of the temple pieces 46 and 47. As illustrated in the embodiment of FIG. 1, the computer 61 can sized and shaped similar to the size and shape of one of the temple pieces 46, 47 and is thus disposed almost entirely if not entirely within the structure and confines of such temple pieces 46 and 47. In other embodiments, the computer can be sized and shaped to fit entirely within the frame 32. In other embodiments, the computer 61 can be disposed in both of the temple pieces 46, 47. The computer 61 can include one or more processors with memory, wireless communication modules and circuitry, a power source, and the like. As described above, the computer 61 comprises low-power circuitry, high-speed circuitry, and a display processor. Various other embodiments may include these elements in different configurations or integrated together in different ways and in different portions of the eyewear 31. Additional details of aspects of computer 61 may be implemented with use of a camera device 69 and other components (e.g. microphone, display, etc.). Further aspects of the computer 61 may be implemented remotely as discussed in detail subsequently.

The computer 61 additionally includes a battery 62 or other suitable portable power supply. In one embodiment, the battery 62 is disposed in one of the temple pieces 46 or 47. However, in other embodiments the battery can be disposed in the frame 32 or in both the frame 32 and one or more of the temple pieces 46, 47. In the eyewear 31 shown in FIG. 1, the battery 62 is shown as being disposed in left temple piece 46 and electrically coupled using connection 74 to the remainder of the computer 61 disposed in the right temple piece 47. This arrangement can be modified in other embodiments.

The computer 61 can couple to and/or communicate with one or more external sources such as power, data, or power and data sources. These external sources can comprise input and output devices for the electronics. As discussed previously, communication and/or charging of the electronics can be accomplished via one or more connectors such as pogo-pins, contacts, pads, magnet, micro-USB, ports, and the like.

According to the embodiment of FIG. 2, the eyewear 31 includes cameras 69. Although two cameras are depicted, other embodiments contemplate the use of a single or additional (i.e., more than two) cameras. In various embodiments, eyewear 31 may include any number of input sensors or peripheral devices such as LEDs or other visual displays, microphones, and the like in addition to cameras 69. Front piece 33 is provided with an outward facing, forward-facing or front or outer surface 66 that faces forward or away from the user when the eyewear 31 are mounted on the face of the user, and an opposite inward-facing, rearward-facing or rear or inner surface 67 that faces the face of the user when the eyewear 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices or peripherals can additionally include biometric sensors, location sensors, or any other such sensors. The electronics 60 can additionally include a video processor such as a microprocessor integrated circuit (IC) customized for processing sensor data from cameras 69, along with volatile memory used by the microprocessor to operate. Electronics 60 can additionally include memory such any storage device capable of storing data generated by the camera, the video processor, and other electronics. Memory can be integrated with high-speed circuitry, can be an independent standalone element, or can be remote or integrated into the eyewear 31.

Many varieties of applications can be executed on a mobile device linked to communicate with the eyewear 31, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session. The mobile device can include a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In other examples, the mobile device includes a social messaging app such as SNAPCHAT® that, consistent with some embodiments, allows users to exchange ephemeral messages that include media content. In this example, the social messaging app can incorporate aspects of embodiments described herein.

Figure 3:
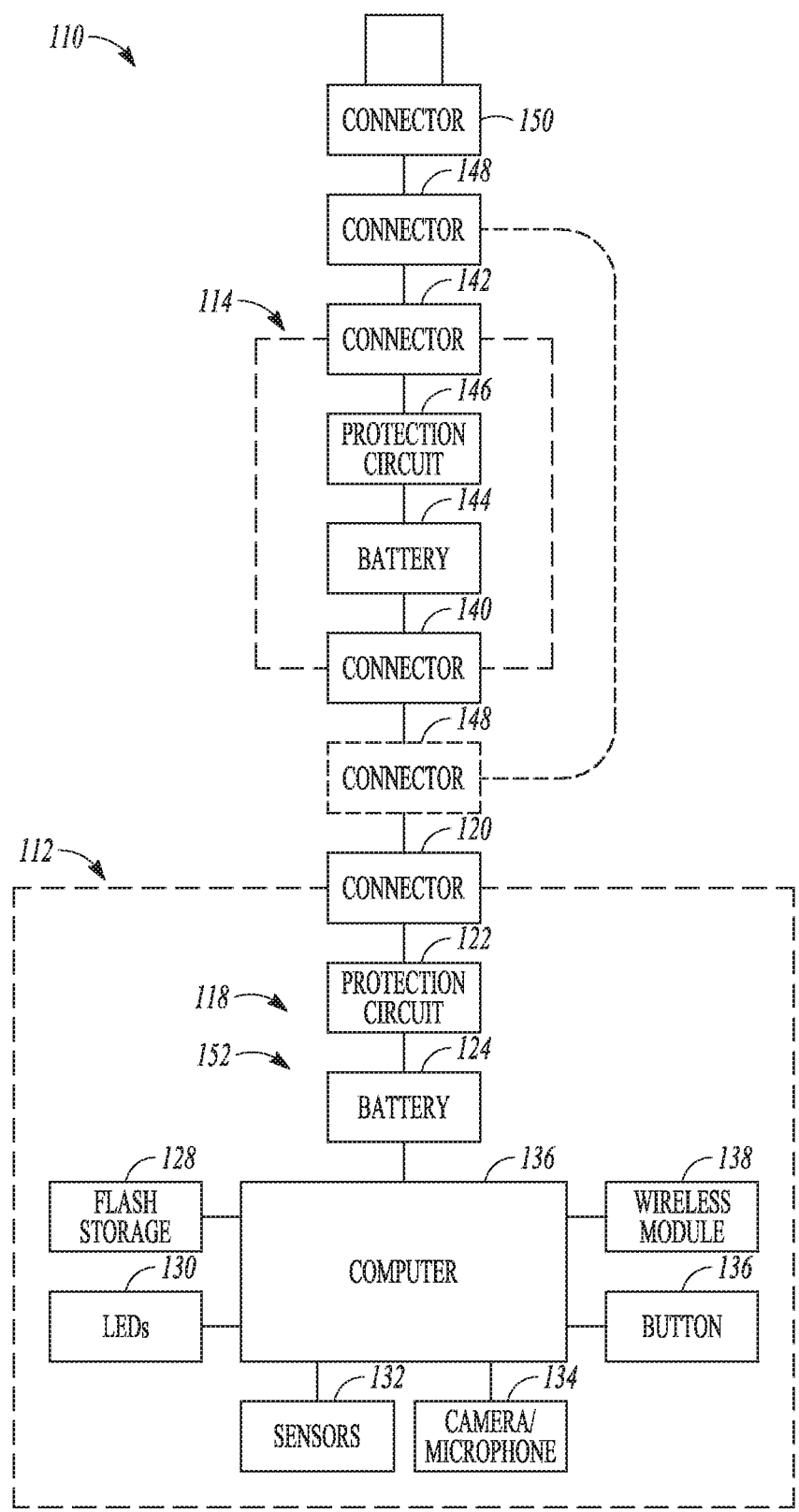
FIG. 3 is a diagram of a system including eyewear, according to an example embodiment.

FIG. 3 shows a diagram of a system 110 according to one embodiment. The system 110 can incorporate various aspects discussed in reference to FIGS. 1-2. According the example embodiment of FIG. 3, the system 110 includes eyewear 112, a case 114, and a cable 116. The system 110 of FIG. 3 focuses on various aspects used for providing power used by electronics 118 of the eyewear 112. The electronics 118 include a first connector 120, a protection circuit 122, a battery 124, a computer 126, a memory 128 (e.g., flash storage), a display 130 (e.g., LCD, LED, and the like), a sensor 132, a camera/microphone 134, a capture device 136 (e.g., a button), and a wireless module 138. The case 114 includes a first connector 140, a second connector 142, a battery 144, and a protection circuit 146. The cable 116 includes a first connector 148 and a second connector 150.

The system 110 can operate and interact in a manner similar to the kit 10 discussed in regards to FIGS. 1-1D. Thus, system 110 illustrates the first connector 148 that is configured to couple either directly to the first connector 120 of the eyeglasses 112 (as indicated by the dashed line) or to the second connector 142 of the case 114 (as indicated by the solid line). In this manner, power can be provided to the battery 144 housed in the eyewear 112. Thus, eyewear 112, in particular the first connector 120, is configured to selectively couple to and decouple from the first connector 140 of the case 114 and the first connector 148 of the cable 116. Such coupling and decoupling can be accomplished in the manner previously discussed. The protection circuits 122 and 146 operate to protect electronics from surge that can damage operation of components. As previously, discussed, the second connector 150 (e.g., USB) can be connected to an external source, such as a power source, a data source, or a power and data source for power transfer to and communication with electronics of the case 114 and the electronics 118 of the eyewear 112.

The operation and other aspects of the electronics 118 have been discussed previously, and therefore, will not be discussed in great detail. According to the example embodiment of FIG. 3, the electronics 118 can be mounted to the eyewear 112 (e.g., to the temple, to the frame, or to both the temple and the frame). According to other embodiments, components described can be incorporated into the case 114 or otherwise be remote from the eyewear 112. In FIG. 3, the battery 124 is configured to operationally store charge. The system 110 includes a circuit 152, such as the protection circuit 122, coupled to the battery 124 and configured to deliver a charge to and from the battery 124. One or more of the camera/microphone 134, the sensor 132, the display device/indicator 130, the memory 128, the actuator 136, and the wireless module 138 can be arranged in communication with the computer 126 as illustrated in FIG. 3.

Figure 4:
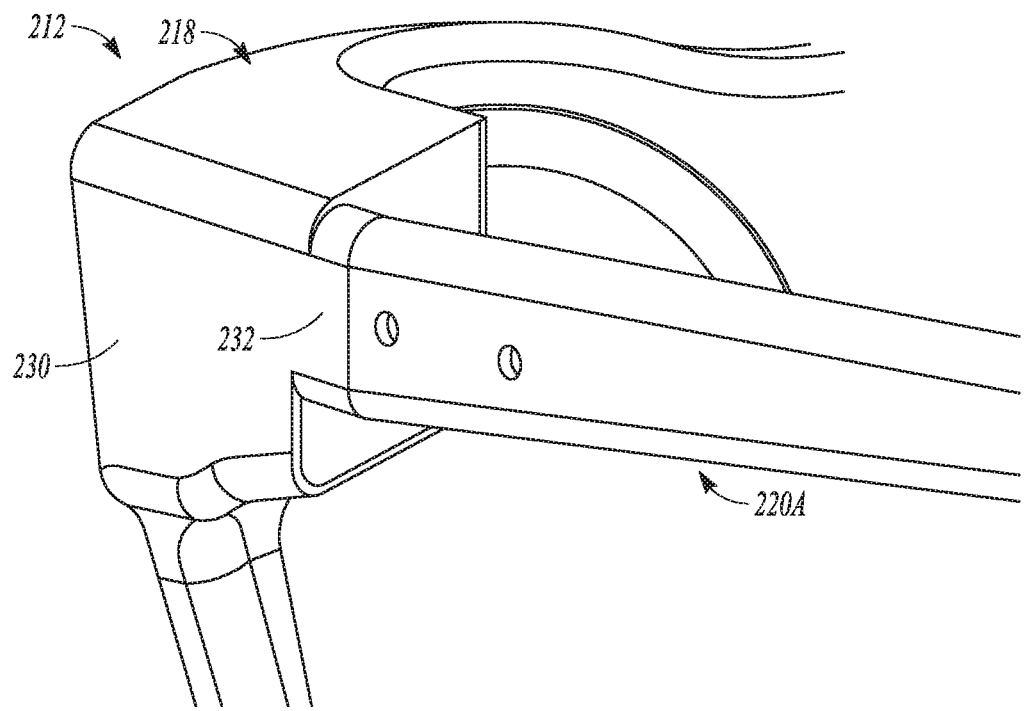
FIG. 4 is a perspective view of a portion of a frame and a portion of a temple of eyewear in an extended first position according to an example embodiment.

FIG. 4 is a perspective view of eyewear 212 showing a portion of a frame 218 and a temple 220A. Eyewear 212 is constructed in a manner similar to glasses 12 previously discussed, and thus includes two temples (only temple 220A is illustrated in FIG. 4), According to the embodiment illustrated in FIG. 4, the eyewear 212 comprise smart eyewear, although in other examples the eyewear 212 can be conventional eyewear.

As discussed with respect to glasses 12 of FIG. 1, the frame 218 can also include two opposing connection portions. However, only connection portion 230 is illustrated in FIG. 4. In FIG. 4, the temple 220A is disposed in wearable position with respect to the frame 218. This position is sometimes referred to herein as a first position or a first wearable position, herein. In this position, an end 232 of the temple 220A interfaces with and covers portions of the connection portion 230. Thus, as will be illustrated subsequently, some electronic components mounted to the connection portion 230 of the frame 218, such as a connector in the example form of a connection port 240 (FIG. 5), are covered by the temple 220A when the temple 220A is in in the first position. When covered, the port 240 is protected by and hidden from view making the eyewear 212 more appealing and wearable to the user.

FIG. 5 shows the portions of the eyewear 212 including the frame 218 and the temple 220A moved to the folded position to expose the port 240 and portions of the connection portion 230. As discussed in the overview, this position need not be entirely folded but sufficiently folded so as to expose port 240 for charging and/or data transfer. This position may be referred to herein as a second position, a second folded position, or a charging position, herein. As shown in the embodiment of FIG. 5, the port 240 can comprise two contacts or pads, which can be waterproof. However, additional forms of connection including additional pads, micro-USB, port, etc. are anticipated. In FIG. 5, the port 240 is mounted in a projection 242 that extends from and is integral with the connection portion 230. The projection 242 can comprise an integral portion of the frame 218 and can be formed with the remainder of the connection portion 230 according to some embodiments. However, in other embodiments the projection 242 and/or connection portion 230 may not be integral with the frame 218. The projection 242 can comprise a portion of a hinge or other mechanism (not illustrated) according to some example embodiments. In other example embodiments, the port 240 can be disposed in the connection portion 230 adjacent (spaced from) the hinge or other coupling element. In still further embodiments, the port 240 can be part of the hinge/coupling assembly between the frame 218 and the temple 220A.

FIG. 6 shows a perspective view of eyewear 312 including a frame 318 and a temple 320A similar in some aspects to those previously discussed, Frame 318 can include a connection portion 330 and a port 340. The temple 320A can include electronics 318A (FIGS. 6A and 6B) including a second port 350. According to the embodiment of FIG. 6, the port 340 includes pads 342A, 34213 and a magnet 344. The second port 350 includes pins 352A, 352B and a magnet or magnetically attracted material 354. The eyewear 312 also includes a hinge assembly 360. The hinge assembly includes hinge portions 362, 364, and 366.

The connection portion 330 (and the frame 318 in general) is configured to mount the electronics including the port 340. Similar to the embodiment of FIG. 5, in the embodiment of FIG. 6 the port 340 can be disposed on a projection 332 from the connection portion 330 and is on a face 334 that selectively interfaces with an end face 322 of the temple 320A. However, in the embodiment of FIG. 6, the projection 332 comprises a portion of a hinge assembly 360. As such, one or more hinge portions 362 comprising part of the hinge assembly 360 extend generally laterally from the projection 332 (e.g., generally laterally with respect to the face 334) adjacent the port 340. According to some embodiments the projection 332 and hinge portions 362 are integrally formed as a single piece from the frame 318 (e.g., by injection molding). The hinge assembly 350 can further include hinge portions 364 and 366 of the temple 320A, which correspond to and receive one or more hinge portions such as hinge portion 362 of the frame 318. According to the example provide in FIG. 6, the hinge portions 364 and 366 can rotate about axis A relative to the hinge portion 362 of the frame 318.

As illustrated in the embodiment of FIG. 6, the second port 350 including the pins 352A and 352B are disposed adjacent (i.e. spaced from) the hinge assembly 360 including the hinge portions 364 and 366. According to other embodiments, the second port 350 can be disposed on the hinge assembly 360 similar to the manner of the port 340.

The second port 350 is configured to interface and contact the port 340 when the temple 320A is disposed in the first wearable position of FIG. 4. More particularly, the pins 352A and 352B are configured to make contact with the pads 342A and 34213, Such contact can provide for power and/or data transfer between electronics of the temple 320A and electronics of the frame 318. In such position, the face 334 and the port 340 of the connection portion 330 is substantially covered by the end face 322 of the temple 320A.

In the folded position illustrated in FIG. 6, the port 340 of the frame 318 is uncovered and exposed by movement of the temple 320A relative to the frame 318 as temple 320A can pivot about axis A relative to frame 318 and port 340. This movement uncouples the port 340 from the second port 350 and exposes both connectors 340 and 350 to be coupled to another connector such as one coupled to an external source of power, data, or power and data as discussed previously.

Figure 6A:
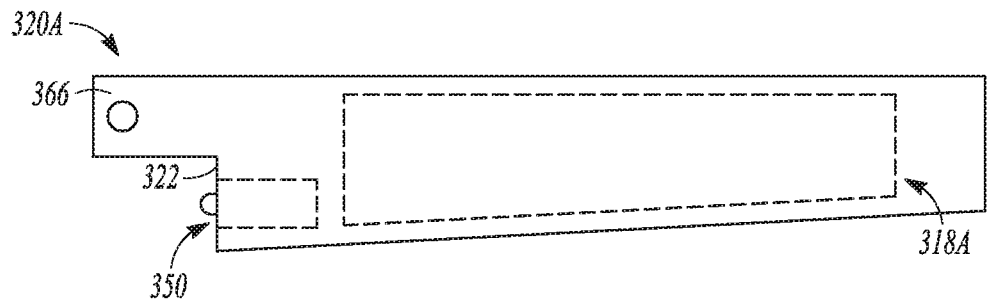
FIGS. 6A and 6B are plan views of the temple and the second connector disposed in the temple according to the example embodiment of FIG. 6.
Figure 6B:
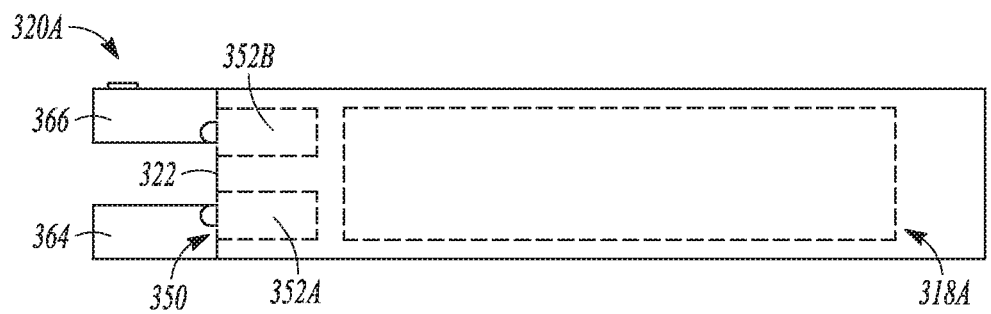

FIG. 6A is a plan view showing a top portion of the temple 320A. FIG. 6B is a side view of the temple 320A. Together FIGS. 6A and 6B that provide further illustration of portions of the temple 320A of FIG. 6 but do not illustrate magnet 354 (FIG. 6). As discussed the temple 320A includes an end face 322 having the second port 350 (e.g., pins 352A and 352B in FIG. 6B) mounted to extend therefrom. The second port 350 is spaced from the hinge portions 364 (FIG. 6B) and 366. The temple 320A can also include additional electronics 318A such as a battery, which is configured to operationally store charge, a circuit that is coupled to the battery and configured to deliver a charge to and from the battery, a computer, and additional devices. The additional devices can include one or more of a camera, a microphone, a sensor, a display device, an indicator, a memory, an actuator, and a wireless module in communication with the computer.

Figure 7:
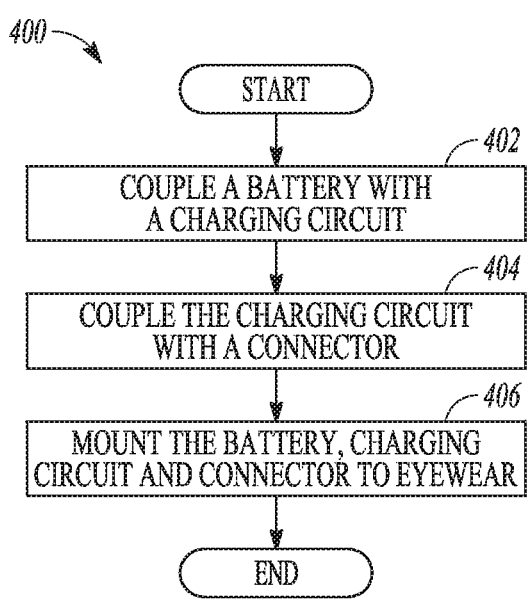
FIG. 7 is a diagram illustrating a method related to the eyeglasses according to some example embodiments.

FIG. 7 illustrates a method 400 according to one embodiment. The method 400 can include coupling 402 a battery with a charging circuit, coupling 404 the charging circuit to a connector that is configured to be selectively coupled to and decoupled from an external power source, and mounting 406 the battery, the charging circuit, and at least a portion of the connector to eyewear, the connector interfacing an area between a frame of the eyewear and a temple of the eyewear when the temple is in a wearable position.

According to some embodiments, the step of mounting can include enclosing the battery, the charging circuit, and the at least a portion of the connector in one or both of the frame or temple. The frame can be coupled to the temple with a hinge. The connector is disposed adjacent to or as part of the hinge such that the connector is covered by one of the frame or hinge when the frame is in a first extended position and the connector is exposed for coupling to or decoupling from the external power source when the frame is in a second folded position. According to some embodiments, the method 400 can further include coupling the battery, the charging circuit, and at least a portion of the connector to one or more of a computer, and one or more of a camera, microphone, a sensor, a display device, an indicator, a memory, an actuator, and a wireless module in communication with the computer. The method 400 can also provide a case configured to receive the eyewear therein with the temple in the second folded position. The case can be configured as the external power source and have a second connector configured to mate with the connector of the eyewear. In some example embodiments, a cable can be provided that can be configured to mount to the area of the eyewear comprising at least one of a hinge portion of the frame or a hinge portion of the temple. The cable can include a connector configured to mate with the connector of the eyewear and a second connector configured to couple to the external power source. According to other embodiments, the connector can further comprise a communication port configured to be selectively coupled to and decoupled from an external data source.

Figure 8A:
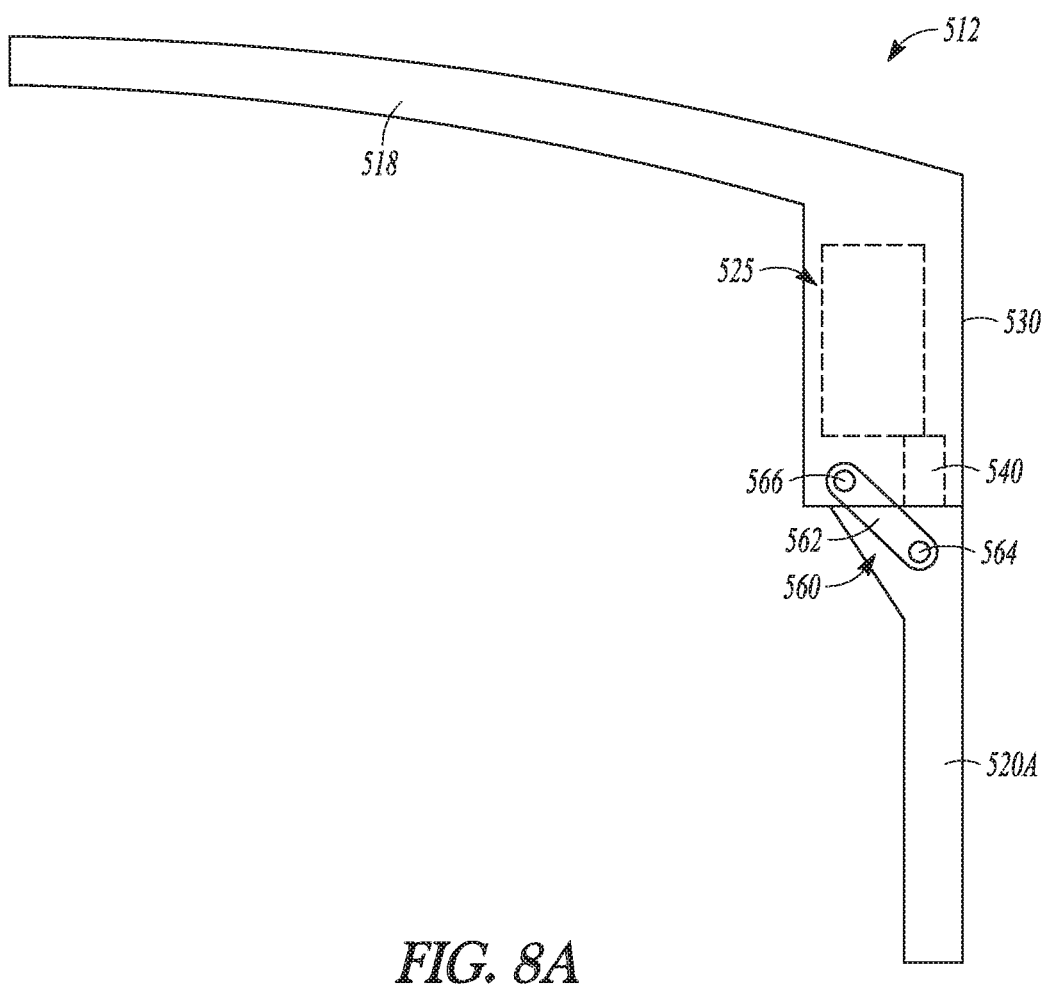
FIGS. 8A, 8B, and 8C are plan views of a linkage assembly coupling the frame to the temple according to some example embodiments.
Figure 8B:
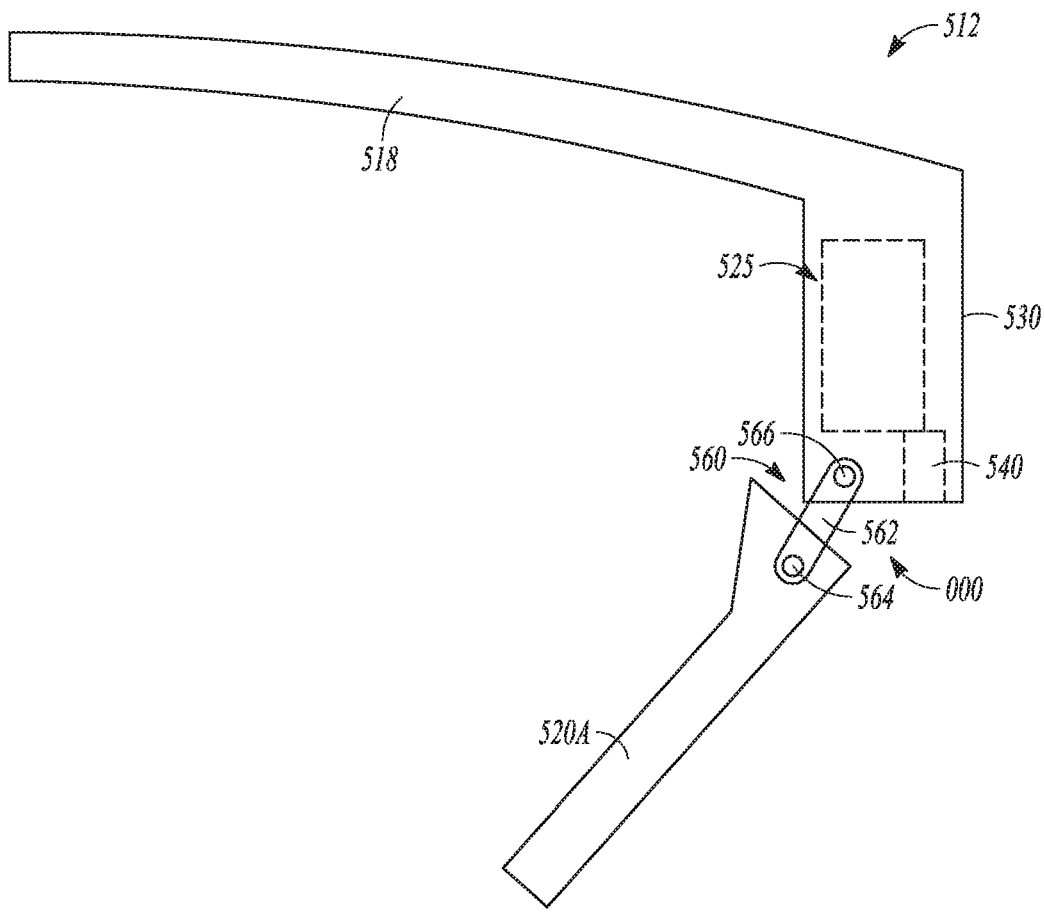
Figure 8C:
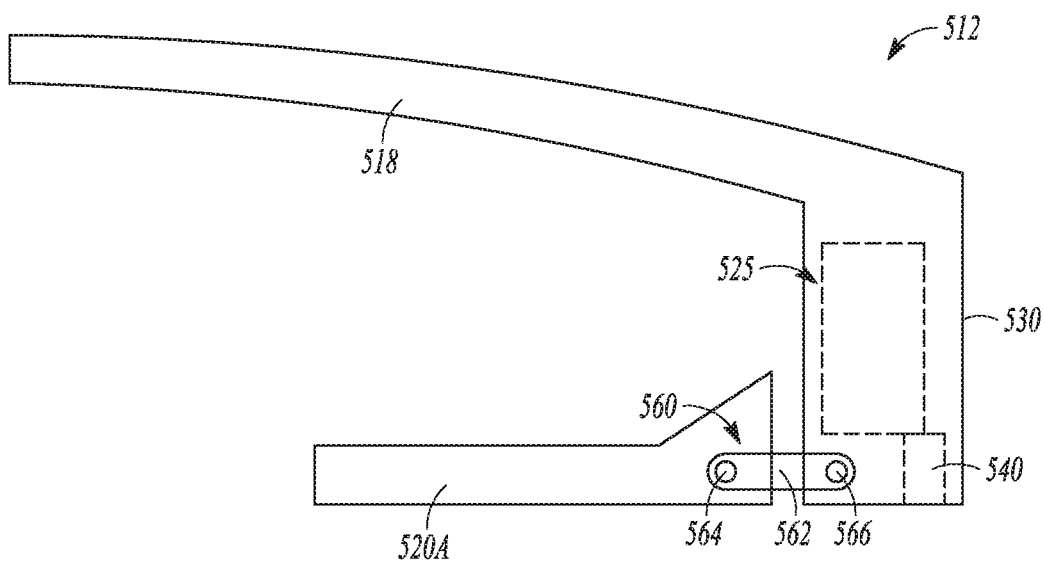

FIGS. 8A, 8B, and 8C illustrate eyewear 512 according to another example embodiment. The eyewear 512 includes a frame 518 and a temple 520A, only a portion of each is shown in FIGS. 8A, 8B, and 8C. The frame 518 includes electronics 525 including a port 540. The eyewear 512 also includes a linkage assembly 560 including a member 562 and pins 564 and 566.

Similar to the other embodiments discussed previously, the frame 518 includes a connection portion 530 configured to house at least some of the electronics 525 including the port 540. The temple 520A is coupled to the frame 518 at the connection portion 530. In the embodiment of FIGS. 8A, 8B, and 8C, such coupling is accomplished by the linkage assembly 560. The port 540 can be disposed adjacent the linkage assembly 560 as illustrated and can be exposed with movement of the temple 520A and the linkage assembly 560.

According to the example embodiment of FIGS. 8A, 8B, and 8C, the linkage assembly 560 can be pivotally coupled at a first end portion (e.g. by the pin 564) to the temple 520A and pivotally coupled at a second end portion (e.g. by the pin 566) to the connection portion 530. Thus, the member 562 can pivot about two axes as defined by pins 564 and 566. As is illustrated in FIG. 8C, this dual axis pivoting allows connector 540 to be more readily exposed, and additionally provides temples temple 520A) can be folded closer to a front of the frame 518. The linkage assembly 560 can be configured to move with movement of the temple 520A between the first wearable position and the second folded position as discussed previously.

In FIG. 8A, the temple 520A is illustrated in the first wearable position relative to the frame 518. The linkage assembly 560 is disposed substantially between the temple 520A and the frame 518 when the temple 520A is in the first wearable position. In the position of FIG. 8A, the linkage assembly 560 can be received in receptacles or shaped recesses of the connection portion 530 and an end of the temple 520A and can be substantially almost entirely covered by the temple 520A and the frame 518. Similarly, in the first wearable position the port 540 is covered by the temple 520A as discussed with respect to previous embodiments.

In FIG. 8B, the temple 520A is illustrated as moved to a folded position between the wearable position and a fully folded position. The folded position allows the port 540 to be uncovered from the temple 520A and adequately exposed such that another connector (e.g., from a cable or case) could be coupled to or decoupled from the port 540. As illustrated in FIG. 8B, the linkage assembly 560 moves along with movement of the temple 520A and is now partially exposed. A reminder of the member 562 is received in the temple 520A and the frame 518 at opposing end portions thereof.

In FIG. 8C, the temple 520A is shown in a fully folded position relative to the frame 518. With the temple 520A in such position, the port 540 is exposed for connection to an external source. In the fully folded position, the linkage assembly 560 is disposed substantially orthogonal to and offset from the connection portion 530. More particularly, the linkage assembly 560 is disposed substantially orthogonal to and offset from a face 532 of the connection portion 530.

As illustrated in FIGS. 8A-8C, the linkage assembly 560 allows the temple 520A to be folded to a position closer to a forward (eye) portion of the frame 518. This creates a slimmer profile for the eyewear 512 allowing the eyewear 512 (conventional or smart eyewear) to more easily fit into a pocket, a case, or another object. The linkage assembly 560 also more fully exposes the port 540 than could otherwise be achieved with a hinge assembly. Thus, with the linkage assembly 560 the port 540 can be accessed more easily without having to move the temple 520A to a folded position (although as discussed above a fully folded position is not necessary for facilitating access to the connector even when utilizing a hinge assembly).

Figure 9A:
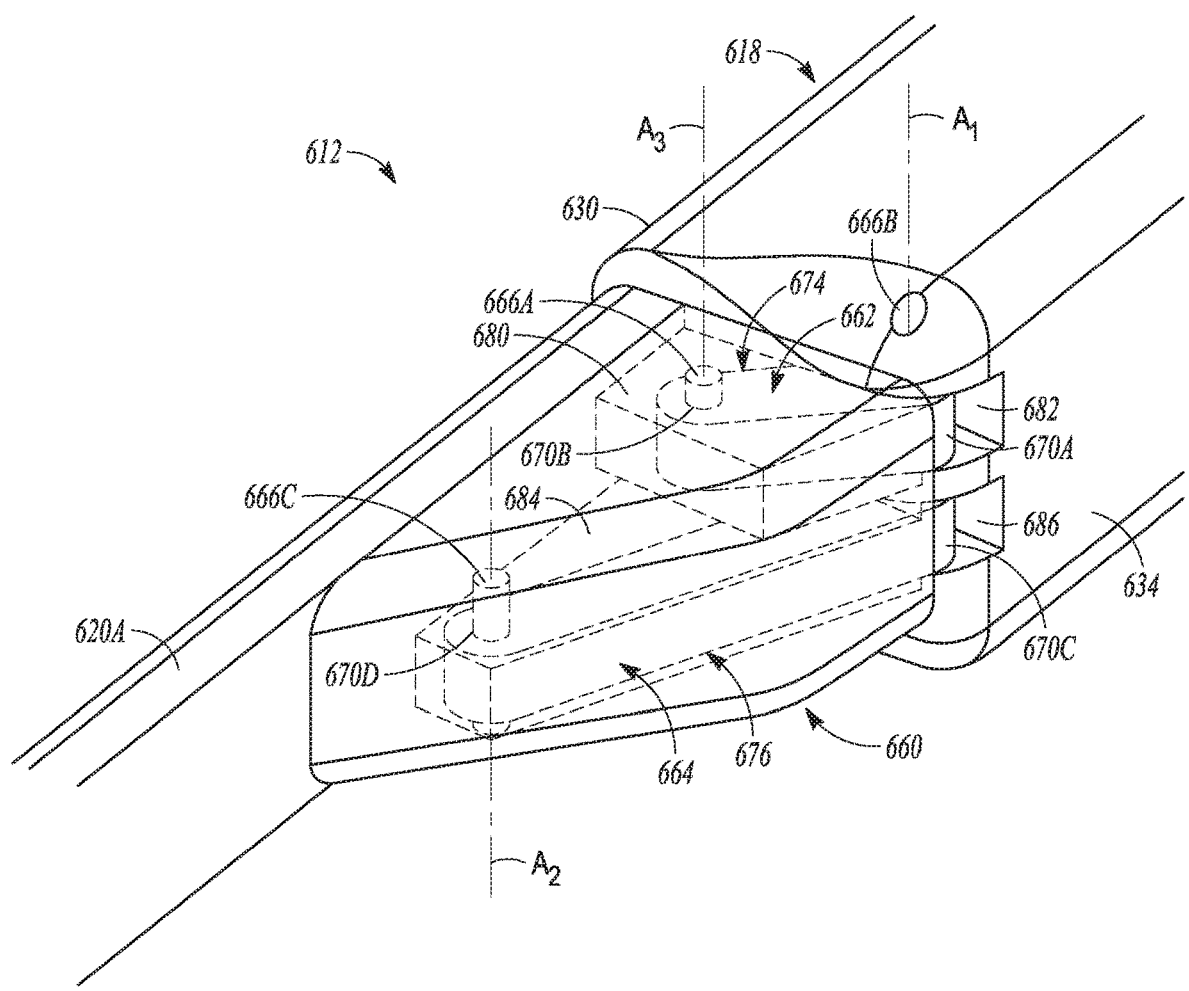
FIGS. 9A, 9B, and 9C are views of a linkage assembly coupling the frame to the temple according to some example embodiments.
Figure 9B:
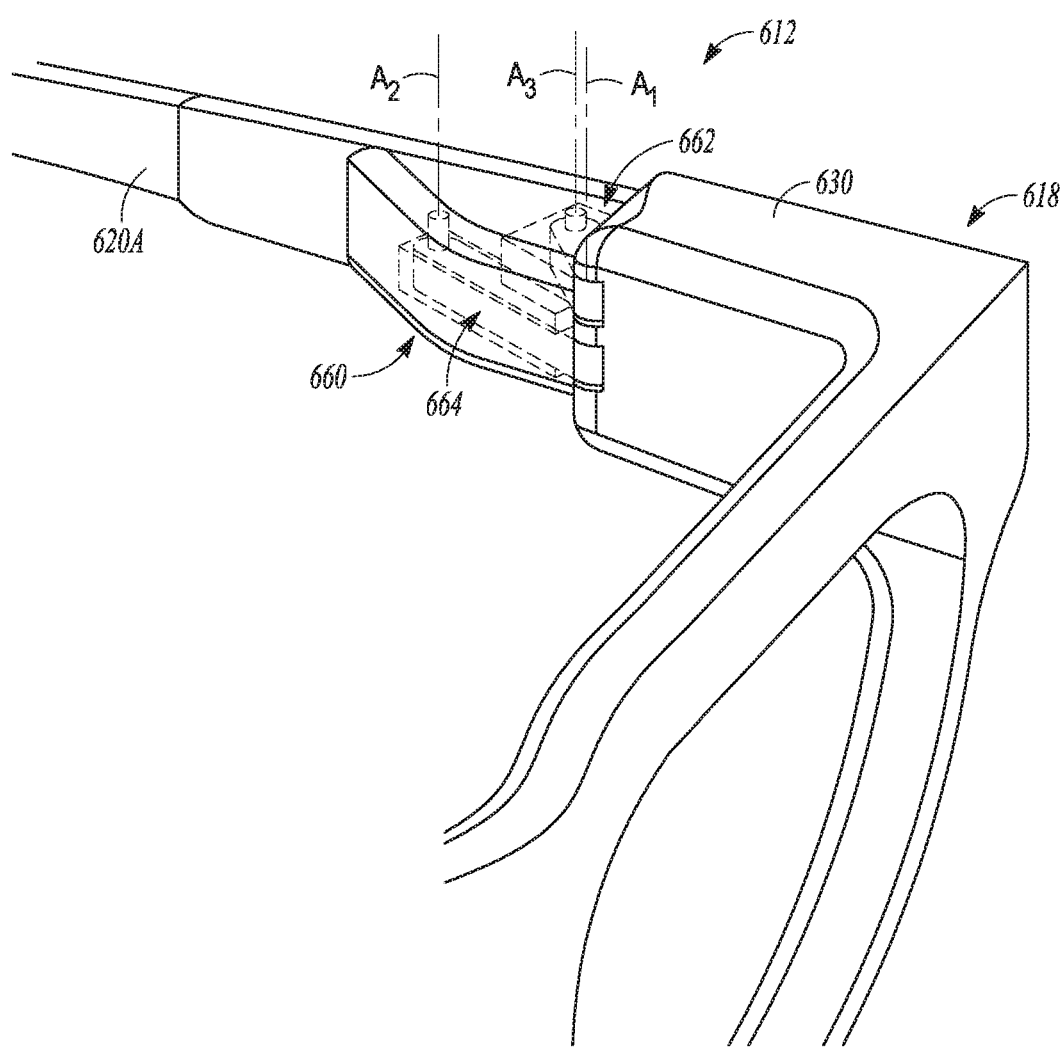
Figure 9C:
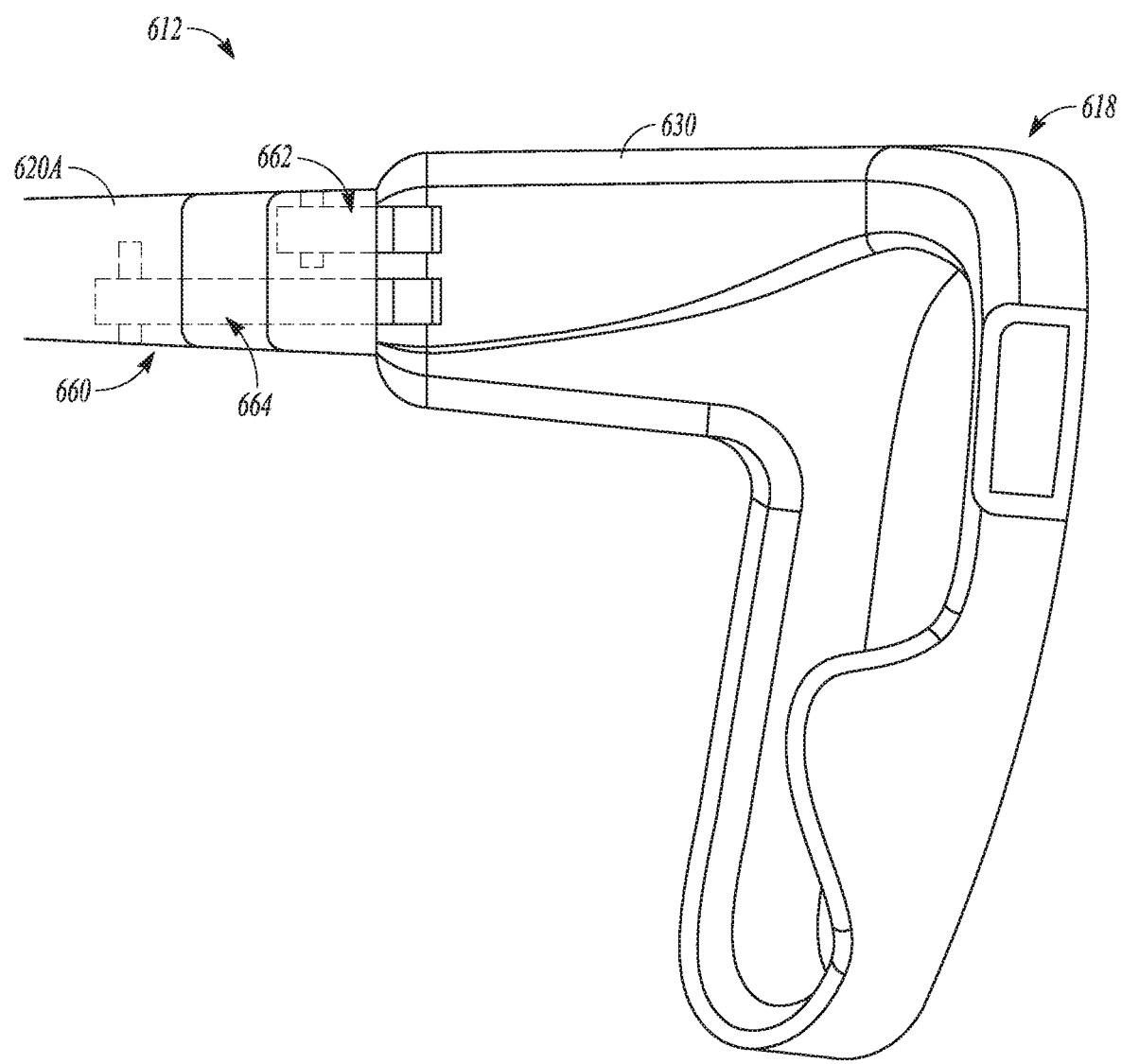

FIGS. 9A-9C illustrate another embodiment of eyewear 612 that includes a linkage assembly 660 in addition to a frame 618 and a temple 620A. As shown in the embodiment of FIGS. 9A-9C, the frame 618 includes a connection portion 630. The linkage assembly 660 includes a first member 662, a second member 664, and pin connections 666A, 666B, and 666C (FIG. 6A).

As illustrated in FIG. 9A, the first member 662 is pivotally coupled to the frame 618 at a first location 670A and is pivotally coupled to the temple 620A at a second location 670B. Similarly, the second member 664 is pivotally coupled to the frame 618 at a third location 670C and pivotally coupled to the temple 620A at a fourth location 670D. According to the embodiment of FIG. 9A, the first location 670A, the second location 670B, the third location 670C, and the fourth location 670D comprise the pin connections 666A, 666B, and 666C. As used herein the term pin connection includes a linkage, a member, an integral pin, a removable pin, and any other item known in the art to provide for pivoting movement.

In the embodiment of FIG. 9A, a length of the second member 664 exceeds a length of the first member 662. According to the embodiment of FIG. 9A, the first and third locations are generally aligned with one another and are disposed in a stacked arrangement. The second and fourth locations are offset from one another and are not stacked. This arrangement allows the first member 662 and the second member 664 to share a single common pin connection 666B to the frame 618. This common pin (king pin) connection 666B is offset (non-symmetrically disposed) in the connection portion 630 so as to be disposed adjacent an interior face 634 interfacing portion of the frame 618. The pin connections 666A, 666B, and 666C can be components that are integrally formed with the frame 618 or the temple 620A or can be separate components as desired. According to other embodiments, the linkage assembly may not utilize a single common pin connection, may not include pivot locations that are generally aligned such as the first and third locations, or the like. According to further embodiments, the pivot locations with the temple 620A may be generally aligned and stacked as illustrated and described in addition to or in alternative to the pivot locations (i.e. the first and third locations) with the temple 618.

Also illustrated in the embodiment of FIG. 9A, the first member 662 is received in a first recess 674 of the temple 620A and the second member 664 is received in a second recess 676 of the temple 620A. A first wall 680 of the first recess 674 acts as a stop for the first member 662 when the temple 620A is in the first position as shown in FIG. 9A. Additionally, a second wall 682 of the first recess 674 acts as a stop for the first member 662 when the temple 320A is in the second position. Similarly, the second recess 676 can have first and second walls 684 and 686 that can act as stops for the second member 664 when the temple 320A is in the first and second positions, respectively.

The arrangement such as illustrated in FIGS. 9A and 9B along with the position common pin connection 666B inward adjacent the wearers temple allows the temple 620A to be folded closely to the frame 618 to create a slim and wearable stowed profile. Such slim stowed profile is also added by connections 666A, 666B, and 666C, which allow for pivoting of each member 662 and 664 about two axes. For example first member 662 can pivot around axis $A_3$ in addition to axis $A_1$. Similarly, the second member 664 can pivot around axis $A_2$ in addition to axis $A_1$. Dual pivoting of each member 662 and 664, the position of the king pin connection 66B, and use of internal cavities receiving the members 662 and 664 in the temple 620A allow for positioning of the temple 620A relatively close to the frame 618.

Figure 10A:
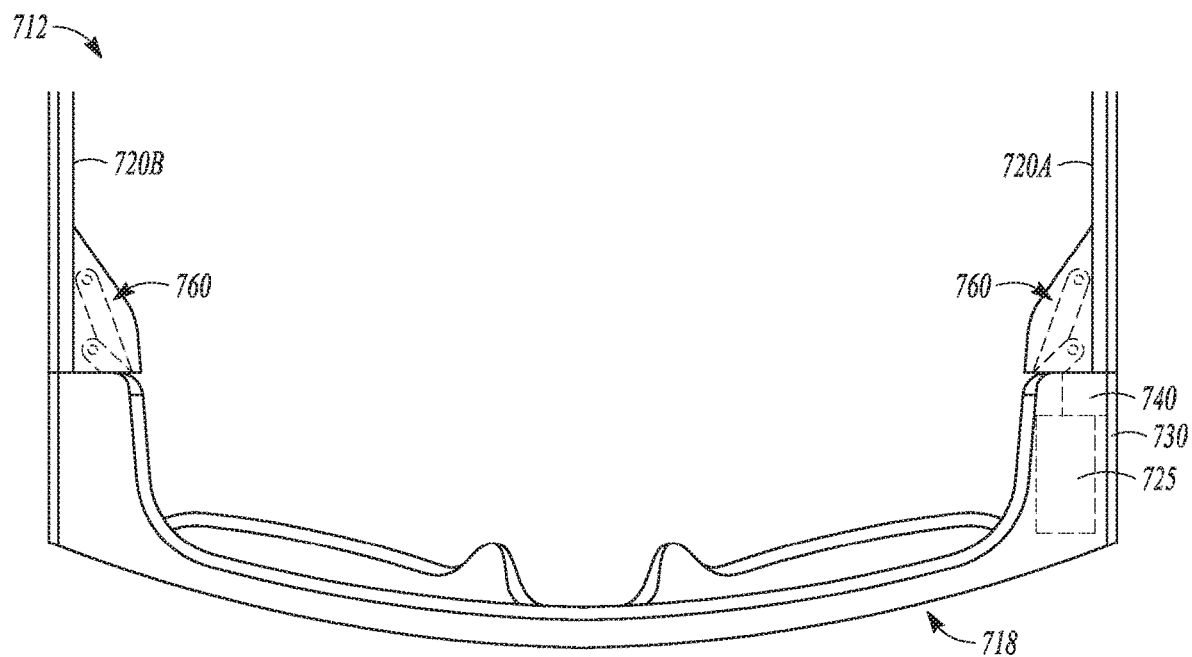
FIGS. 10A and 10B are views of eyewear including another linkage assembly and a connector in communication with electronics according to some example embodiments.
Figure 10B:
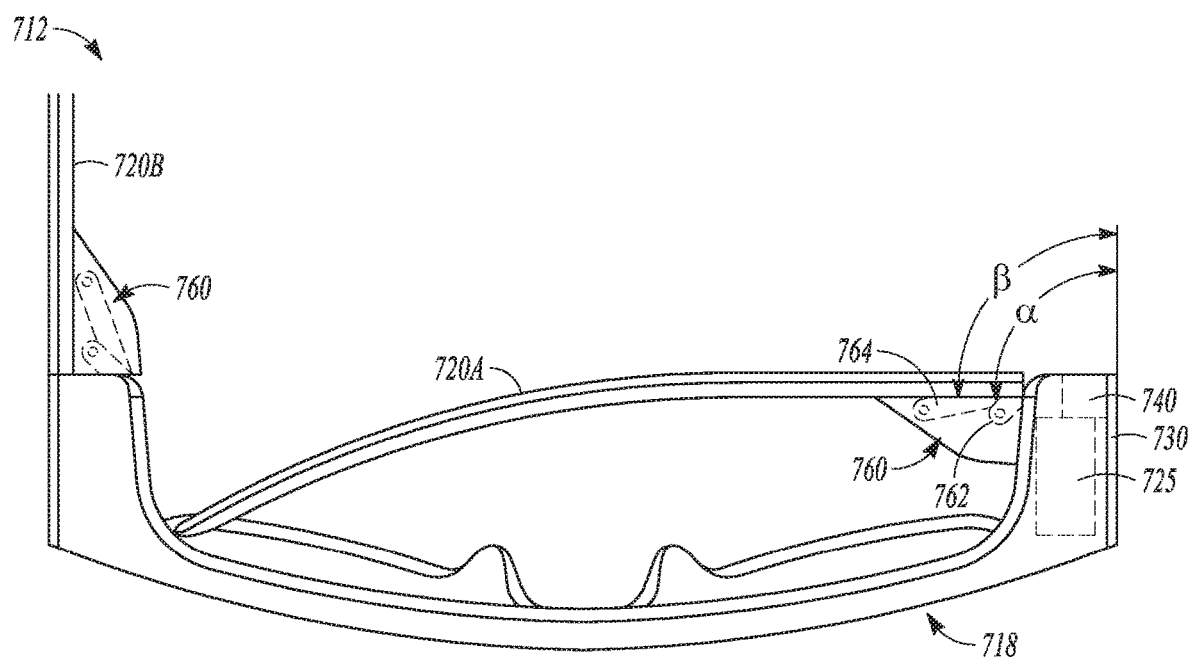

FIGS. 10A and 10B illustrate another embodiment of eyewear 712 including a frame 718, temples 720A and 720B, and a linkage assemblies 760.

Each linkage assembly 760 is constructed and arranged in a manner similar to that of linkage assembly 660, and therefore, will not be discussed in great detail. According to the embodiment of FIGS. 10A and 10B the eyewear 712, in particular, the frame 718 includes electronics 725 including a first connector 740 mounted to the connection portion 730.

As discussed with respect to other embodiments, the electronics 725 can include a battery, which is configured to operationally store charge, a circuit that is coupled to the battery and configured to deliver a charge to and from the battery, a computer, and additional devices. The additional devices can include one or more of a camera, a microphone, a sensor, a display device, an indicator, a memory, an actuator, and a wireless module in communication with the computer.

FIG. 10A illustrates both temples 720A and 720B disposed in the first wearable position. In such position, each linkage assembly 760 is disposed generally between the frame 718 and the temples 720A and 720B. FIG. 10B illustrates one of the temples 720A moved to the second folded position. Due to the configuration of the frame 718 and the temple 720A, the linkage assembly 760 may be at least somewhat exposed to view and access at pivoting end portions that are coupled to the frame 718 according to the embodiment of FIG. 10B. FIG. 10B also illustrates that the first connector 740 is exposed for coupling and decoupling to an external source when the temple 720A is disposed in the second position.

As illustrated in FIG. 10B, an amount of pivotal movement (indicated by symbol $\alpha$) of a first member 762 differs from an amount of pivotal movement (indicated by symbol $\beta$) of a second member 764 with movement of the temple 720A between the first wearable position (FIG. 10A) and the second folded position FIG. 10B).

Similar to the linkage assembly 560 of FIGS. 8A-8C, the linkage assemblies 660 and 760 discussed herein allow the temple 620A, 720A to be folded to a position closer to a forward (eye) portion of the frame 618, 718. This creates a slimmer profile for the eyewear 612, 712 allowing the eyewear 612, 712 (conventional or smart eyewear) to more easily fit into a pocket, a case, or another object. The linkage assembly 760 also more fully exposes the first connector 740 than could otherwise be achieved with a simple hinge assembly. Thus, with the linkage assembly 760 the first connector 740 can be accessed more easily without having to move the temple 720A to a fully folded position (although as discussed above a fully folded position is not necessary for facilitating access to the connector utilizing a hinge assembly).

The above-described example embodiments provide apparatuses, systems and methods that allow eyewear (both conventional and smart) and other wearable objects to be more functional (e.g. slimmer, more portable, more easily coupled to other external sources) as well as more wearable and aesthetically pleasing. Certain embodiments described in detail herein include smart eyewear. One aspect of the disclosure comprises eyewear that includes electronics, a frame, and a temple. The frame can have two opposing connection portions, at least one of the connection portions housing a first connector for the electronics mounted to the frame. The temple can be coupled to the one of the connection portions and can be selectively moveable between a first position in which the first connector is covered by the temple and a second position in which the first connector is exposed for coupling to an external source.

According to one embodiment, the wearable device includes a body, electronics, and a connector. The body is configured to hold one or more optical elements, the body being disposable between a collapsed condition and a wearable condition in which the device is wearable by a user to hold the one or more optical elements within user view. The electronics are carried by the body. The connector is configured to enable establishment of an electrical and/or electronic connection with the electronics via the connector, the connector being housed by the body such that the connector is substantially obscured from view when the body is in the wearable condition, and such that the connector is exposed for connective access when the body is in the collapsed condition.

According to disclosed embodiments, the electronics can be mounted to the frame, the temple(s), or both the frame and the temple of the eyewear. Such electronics can include a battery, which can be configured to operationally store charge, a circuit that can be coupled to the battery and configured to deliver a charge to and from the battery, a computer, and additional devices. The additional devices can include one or more of a camera, a microphone, a sensor, a display device, an indicator, a memory, an actuator, and a wireless module in communication with the computer.

In further embodiments, the disclosed connectors can include a magnet or a material that is attracted to a magnetic field. The magnet (or attractable material) can facilitate coupling of the external source to the connector. The eyewear can further include a hinge assembly coupling the frame to the temple, where the connection portions include one or more hinge projections configured to receive a pin of the hinge assembly. In some embodiments, the first connector can be part of or disposed adjacent to the hinge assembly.

According to some embodiments, a system is disclosed that can include eyewear and a case. The eyewear can comprise a frame and a temple. The eyewear can be configured to receive electronics including a first connector. The first connector can be disposed at a portion of the eyewear that selectively interfaces with and is covered by one of the temple or the frame when the temple is coupled to the frame and disposed in a first wearable position and is exposed when the temple is coupled to the frame and disposed in a second folded position. The case can be configured to receive the frame and the temple therein with the temple disposed in the second position relative to the frame. The case can include a second connector configured to couple to the first connector of the eyewear. The case can be configured to house a battery that powers the electronics mounted to the eyewear.

According to further embodiments, the system can include a cable configured to couple to the first connector of the eyewear when the temple is disposed substantially in the second position and configured to couple to at least one of the second connector or a third connector of the case. The cable can be configured to couple with an external source of power, data, or power and data for the electronics mounted to the eyewear. According to further embodiments, at least one of the frame, the temple, and the case can be configured to house the electronics.

The disclosed example embodiments also include a wearable device including a frame, a temple, electronics, and a linkage assembly. The frame can have two opposing connection portions and the temple can be configured to selectively interface with one of the two connection portions. The electronics can be mounted to at least one of the temple and the frame. The linkage assembly can be pivotally coupled at a first end portion to the temple and pivotally coupled at a second end portion to the one of the two connection portions. The linkage assembly can be configured for movement with movement of the temple between a wearable position and a folded position.

According to further embodiments, the linkage system can comprise a linkage including a first member and a second member. The first member can be pivotally coupled to the frame at a first location and pivotally coupled to the temple at a second location. The second member can be pivotally coupled to the frame at a third location and pivotally coupled to the temple at a fourth location. A length of the second member can exceed a length of the first member.

In additional embodiments, an amount of pivotal movement of the first member can differ from an amount of pivotal movement of the second member with movement of the temple between a first wearable position and a second folded position. The first location, the second location, the third location, and the fourth location can comprise pin connections. The first member and the second member can share at least one common pin connection to the frame. The common pin can be offset in the one connection portion so as to be disposed adjacent an interior face interfacing portion of the frame. Additionally, the first member can be received in a first recess of the temple and the second member can be received in a second recess of the temple. A first wall of the first recess can act as a stop for the first member when the temple is in the first position and a second wall of the first recess acts as a stop for the first member when the temple is in the second position.

This disclosure applies to both "smart" eyewear (e.g., those have electronics mounted thereto) and to conventional eyewear. Smart eyewear includes electronics such as a power source, power and communication related circuitry, communication devices (e.g., a camera, a microphone, sensors, etc.), display devices, a computer, a memory, and/or the like. As used herein, conventional eyewear makes no use of electronics and is purely mechanical and optical in nature. Examples of conventional eyewear include prescription eyeglasses, sunglasses, and construction glasses.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A device comprising:
    a portable case body defining a storage space for receiving an electronics-enabled eyewear device;
    an power supply arrangement carried by the case body; and
    a connection port located in the storage space and coupled to the power supply arrangement, the connection port being configured for electrical coupling to a charging connector of the eyewear device when the eyewear device is received in the storage space, thereby to enable charging of an onboard battery of the eyewear device by the power supply arrangement, wherein the connection port of the case includes a magnetic element for co-operation with the charging connector of the eyewear device to facilitate connective location of the eyewear device charging connector relative to connection port of the case.

2. The device of claim 1, wherein the power supply arrangement of the case includes an external power connector for connection to a power supply external to both the case and the eyewear device.

3. The device of claim 2, wherein the external power connector comprises a charging port that is similar in connective configuration to the charging connector of the eyewear device.

4. The device of claim 2, wherein the power supply arrangement of the case includes a case battery housed in the case body and coupled with the charging connector to enable charging of the onboard battery by the case battery.

5. The device of claim 2, wherein the case battery is connectable to a power supply external to both the case and the eyewear device via an external power connector housed by the case body, to enable charging of the case battery by the external power supply.

6. The device of claim 1, wherein the connection port is configured additionally to establish a data connection with the electronics-enabled eyewear device.

7. The device of claim 1, further comprising the electronics-enabled eyewear device, wherein the charging connector of the electronics-enabled eyewear device is exposed for connective access when at least one of a pair of temples of the eyewear device is in a collapsed condition relative to a frame.

8. The device of claim 7, further comprising a charging cable having a connector that is compatible both with the connection port of the case and with the charging connector of the eyewear device.

9. A method comprising:
coupling a battery with a charging circuit;
coupling the charging circuit to a connector that is configured to be selectively coupled to and decoupled from an external power source;
mounting the battery, the charging circuit, and the connector to a portable case for an eyewear device, the connector interfacing a storage area for the eyewear device within the case; and
coupling a connection port of the eyewear device with the connector.

10. The method of claim 9, further comprising folding a temple of the eyewear device to expose the connection for coupling with the connection port.

11. The method of claim 9, further comprising coupling the charging circuit of the case to a power supply external to both the case and the eyewear device.

12. The method of claim 9, wherein the external power connector comprises a charging port that is similar in connective configuration to the connector port of the eyewear device.

13. The method of claim 9, wherein the connection port is configured additionally to establish a data connection with electronics of the eyewear device.

14. The method of claim 9, further comprising coupling the connection port of the case with the connection port of the eyewear device with a magnetic element.

15. The method of claim 14, wherein the magnetic element is configured for co-operation with the connection port of the eyewear device to facilitate connective location of the eyewear device connection port relative to the connector of the case.

16. A system including a wearable device, the system comprising:
eyewear comprising a frame and a temple, the eyewear configured to carry electronics including a first connection port and a first battery;
a case configured to receive the frame and the temple therein, the case including a second connection port configured to couple to the first connection port of the eyewear, the case configured to house a second battery that supplies a charge to the electronics carried by the eyewear including the first battery; and
a charging cable having a connector that is compatible both with the first connection port of the eyewear and with the second connection port of the case.

17. The system of claim 16, wherein the first connection port is disposed at a portion of the eyewear that selectively interfaces with and is covered by one of the temple or the frame when the temple is coupled to the frame and disposed in a first wearable position, wherein the first connection port is exposed when the temple is coupled to the frame and disposed in a second folded position.

18. The system of claim 16, wherein the first connection port of the case includes a magnetic element for co-operation with the second connection port of the eyewear device to facilitate connective location of the eyewear device second connection port relative to first connection port of the case.

* * * * *